US008706701B1

(12) United States Patent
Stefanov et al.

(10) Patent No.: US 8,706,701 B1
(45) Date of Patent: Apr. 22, 2014

(54) SCALABLE CLOUD FILE SYSTEM WITH EFFICIENT INTEGRITY CHECKS

(75) Inventors: Emil P. Stefanov, Berkeley, CA (US); Marten E. Van Dijk, Somerville, MA (US); Alina M. Oprea, Arlington, MA (US); Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 88 days.

(21) Appl. No.: 13/174,452

(22) Filed: Jun. 30, 2011

Related U.S. Application Data

(60) Provisional application No. 61/415,197, filed on Nov. 18, 2010.

(51) Int. Cl.
*G06F 7/00* (2006.01)
*G06F 17/00* (2006.01)

(52) U.S. Cl.
USPC ........... 707/687; 707/690; 707/694; 707/822; 707/828; 707/829; 713/150; 713/160; 713/161; 713/165; 714/1; 714/48; 714/52; 714/758; 714/799

(58) Field of Classification Search
USPC ......... 707/687, 690, 694, 822, 823, 828, 829; 713/150, 160, 161, 165; 714/1, 48, 52, 714/758, 759, 799
See application file for complete search history.

(56) References Cited

U.S. PATENT DOCUMENTS

| 6,026,474 | A | * | 2/2000 | Carter et al. | 711/202 |
|---|---|---|---|---|---|
| 6,097,811 | A | * | 8/2000 | Micali | 713/186 |
| 7,293,154 | B1 | * | 11/2007 | Karr et al. | 711/202 |
| 7,555,504 | B2 | * | 6/2009 | Bixby et al. | 707/999.01 |
| 7,822,711 | B1 | * | 10/2010 | Ranade | 707/622 |
| 2002/0194484 | A1 | * | 12/2002 | Bolosky et al. | 713/189 |
| 2006/0156059 | A1 | * | 7/2006 | Kitamura | 714/6 |
| 2007/0276807 | A1 | * | 11/2007 | Chen et al. | 707/3 |
| 2008/0270372 | A1 | * | 10/2008 | Hsu et al. | 707/4 |
| 2009/0119280 | A1 | * | 5/2009 | Waters et al. | 707/5 |
| 2010/0162076 | A1 | * | 6/2010 | Sim-Tang et al. | 714/752 |
| 2011/0072059 | A1 | * | 3/2011 | Guarraci | 707/823 |
| 2011/0225429 | A1 | * | 9/2011 | Papamanthou et al. | 713/189 |
| 2012/0030511 | A1 | * | 2/2012 | Wylie et al. | 714/15 |

* cited by examiner

*Primary Examiner* — Hares Jami
(74) *Attorney, Agent, or Firm* — Krishnendu Gupta; Gerald P. Kazanjian

(57) ABSTRACT

Example embodiments of the present invention provide authenticated file system that provides integrity and freshness of both data and metadata more efficiently than existing systems. The architecture of example embodiments of the present invention is natural to cloud settings involving a cloud service provider and enterprise-class tenants, thereby addressing key practical considerations, including garbage collection, multiple storage tiers, multi-layer caching, and checkpointing. Example embodiments of the present invention support a combination of strong integrity protection and practicality for large (e.g., petabyte-scale), high-throughput file systems. Further, example embodiments of the present invention support proofs of retrievability (PoRs) that let the cloud prove to the tenant efficiently at any time and for arbitrary workloads that the full file system (i.e., every bit) is intact, leveraging integrity-checking capabilities to achieve a property that previous PoRs lack, specifically efficiency in dynamic settings (i.e., for frequently changing data objects).

40 Claims, 9 Drawing Sheets

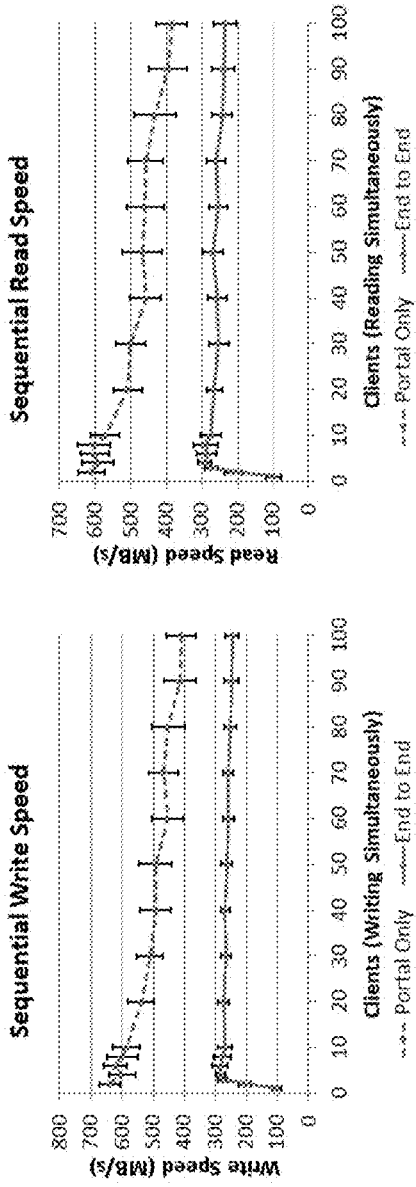
FIG. 8A
FIG. 8B
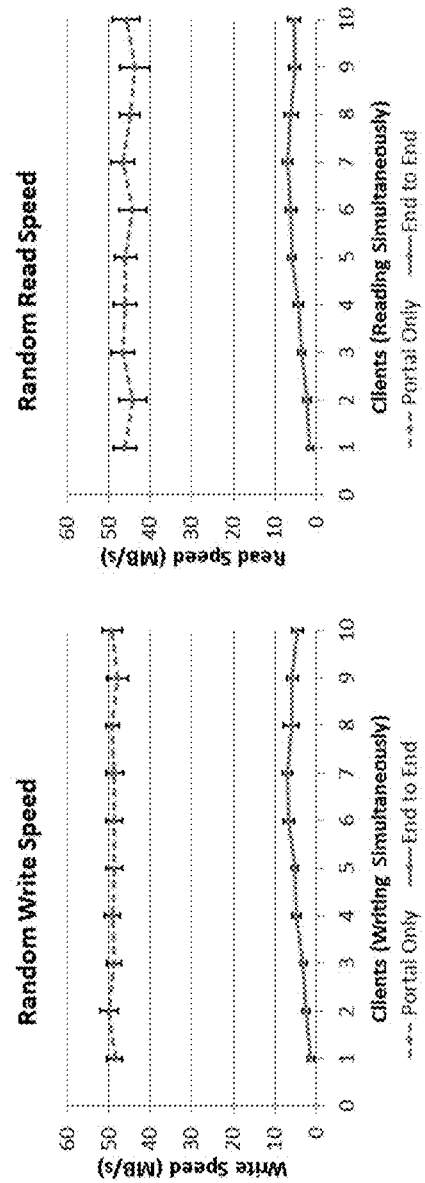
FIG. 9A
FIG. 9B

SCALABLE CLOUD FILE SYSTEM WITH EFFICIENT INTEGRITY CHECKS

CLAIM OF PRIORITY

This application claims priority to U.S. Provisional Patent Application No. 61/415,197 filed on Nov. 18, 2010 entitled "A SCALABLE CLOUD FILE SYSTEM WITH EFFICIENT INTEGRITY CHECKS".

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to file systems.

BACKGROUND

Organizations that embrace cloud computing outsource massive amounts of data to external storage providers. Cost savings, lower management overhead, and elasticity are just some of the attractions of the cloud. But cloud computing entails a sacrifice of control. Tenants give up configuration and management oversight of the infrastructure that contains their computing resources. In cloud storage systems today, for example, tenants can only discover corruption or loss of their data (particularly infrequently accessed data) if their service providers faithfully report failures or security lapses—or when a system failure occurs. This integrity-measurement gap creates business risk and complicates compliance with regulatory requirements.

SUMMARY

Example embodiments of the present invention provide a method, an apparatus and a computer-program product for representing a file system according to an authenticated data structure. The method comprises receiving a designation of a file system and representing the file system according to an authenticated data structure.

BRIEF DESCRIPTION OF THE DRAWINGS

The above and further advantages of the present invention may be better under stood by referring to the following description taken into conjunction with the accompanying drawings in which:

FIGS. 8A-9B are graphs illustrating experimental results;

DETAILED DESCRIPTION

Figure 1:
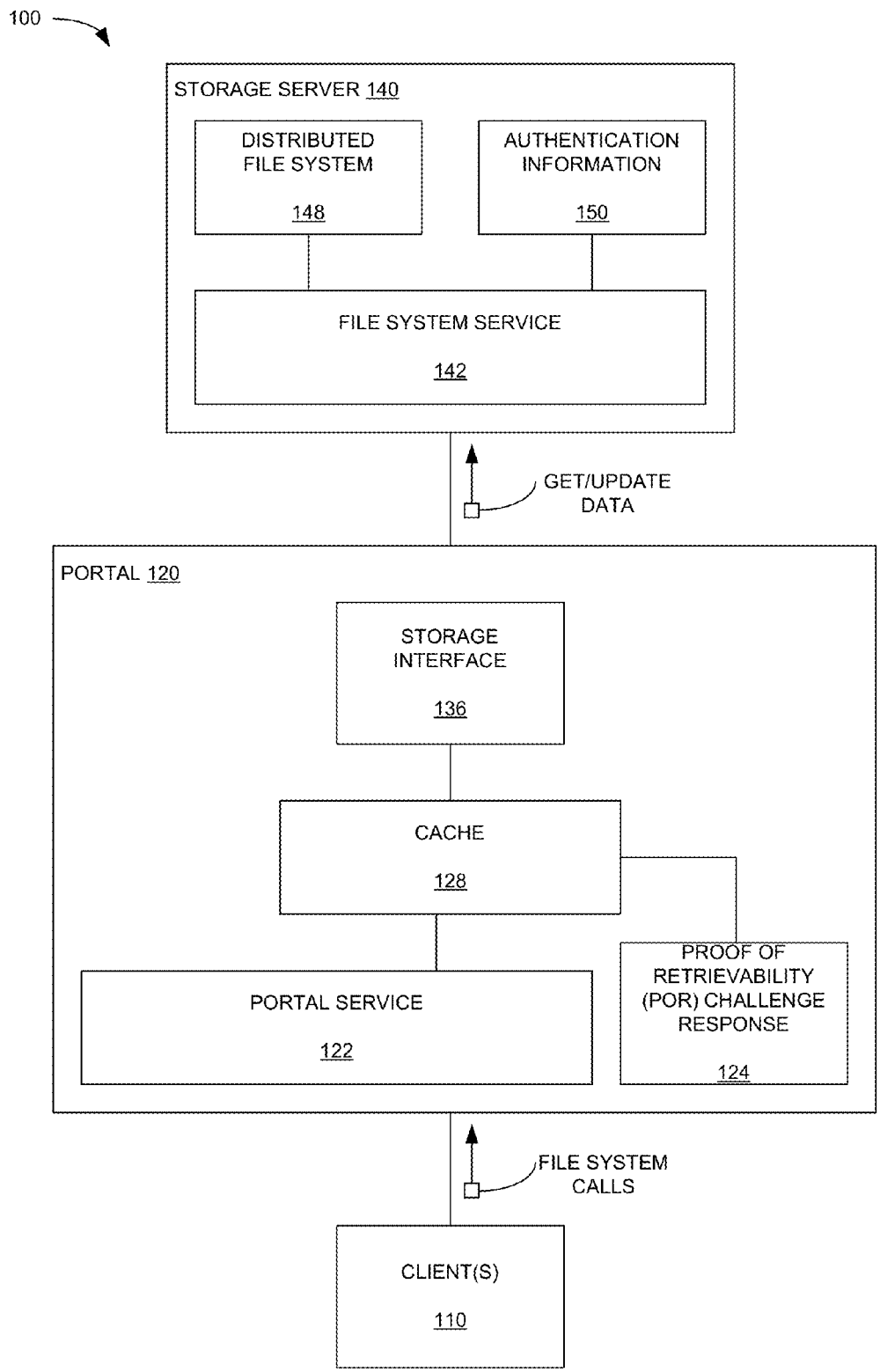
FIGS. 1 and 4 are block diagrams illustrating system architectures according to example embodiments of the present invention.

Early cryptographic file systems were designed to protect data confidentiality and the integrity of data in local storage. Subsequently, cryptographic networked file systems with different integrity guarantees have been designed. Transparent Cryptographic File System (TCFS) and Secure Network-Attached Disks (SNAD) provide data integrity by storing a hash for each file data block. A number of systems construct a Merkle tree over files in order to authenticate file blocks more efficiently.

Many cryptographic file systems provide data integrity but do not authenticate the file system directory structure (or metadata). Others, while authenticating both file system data and metadata, do not provide strong freshness guarantees. SiRiUS does not provide data freshness, but only partial metadata freshness by periodically requiring clients to sign metadata entries. Secure Untrusted Data Repository (SUNDR) implements a consistency notion called "fork consistency" that provides freshness only when clients communicate through out-of-band mechanisms.

Few cryptographic file systems provide freshness of both file system data and metadata. SFSRO and Cepheus build a Merkle tree over the file system directory tree. While this approach has the advantage of efficiently supporting file system operations like moving or deletion of entire directories, it also has the drawback that it results in an unbalanced authentication data structure and has a high authentication cost for directories containing many entries. Athos constructs a balanced data structure that maps the directory tree of the file system in a set of node relations represented as a skip list. However, Athos abstracts away the hierarchical structure of the directory tree and doesn't provide efficient support for some existing file system operations (e.g., garbage collection); moreover, its primary, prototyped design handles only a single client. Federated, Available, and Reliable Storage for an Incompletely Trusted Environment (FARSITE) is a peer-to-peer storage system that uses a distributed directory group to maintain metadata information. Metadata freshness is guaranteed when more than two thirds of the directory group members are correct. Data freshness is provided by storing hashes of file Merkle trees in the directory group.

Example embodiments of the present invention provide authenticated file system that provides integrity and freshness of both data and metadata more efficiently than existing systems. While there is considerable variation in the architectures and integrity guarantees of previous proposals, the architecture of example embodiments of the present invention is natural to cloud settings involving a cloud service provider and enterprise-class tenants, thereby addressing key practical considerations, including garbage collection, multiple storage tiers, multi-layer caching, and checkpointing.

A proof of retrievability (PoR) is a challenge-response protocol that enables a cloud provider to demonstrate to a client that a file is retrievable (i.e., recoverable without any loss or corruption). Proofs of data possession are related protocols that only detect a large amount of corruption in outsourced data. Most existing PDP and PoR protocols are designed for static data (i.e., infrequently modified data).

Dynamic PDP protocols have been proposed, but they were not designed to handle typical file system operations. For example, some support operations like insertion in the middle of a file, but do not efficiently support moving and deleting entire files or directories. Others claim to construct a dynamic PoR solution, but in fact only provide a dynamic PDP scheme, neglecting to update the error-correcting information used to recover from data corruption.

Further, specific constructions of authenticated data structures based on Merkle trees, search trees, skip lists, red-black trees and hash tables have been proposed. These support efficient insertion, search and deletion of elements, as well as proofs of element membership. In principle, a generic authenticated data structure supporting these operations may be used to authenticate data and metadata elements of a file system through membership proofs. However, such a authentication scheme would be neither well-suited to hierarchical directory structures nor optimized for both existing file system operations and the common case of sequential file access.

Example embodiments of the present invention provide a practical, authenticated file system designed to meet the cloud's challenges of high latency, large scale, and potentially untrustworthy service providers. Example embodiments of the present invention operate as a transparent layer enforcing strong integrity guarantees thereby allowing a modestly-resourced tenant to maintain a large (e.g., petabyte-scale) file system in the cloud. Unlike previous outsourced authenticated file systems, example embodiments of the present invention offer efficient proofs of not only data integrity but also freshness and file retrievability.

Further, example embodiments of the present invention support very high file system throughput, thereby demonstrating that strong data authentication can be added without serious impediment to a high-performance file system. At the same time, example embodiments of the present invention address key implementation issues (e.g., directory-structure support, garbage collection and multitiered caching) absent in previous, strongly-authenticated file systems. Example embodiments of the present invention also include novel error-coding techniques for efficient proofs of retrievability (PoRs) over the file system.

Example embodiments of the present invention provide tenants efficient, comprehensive, and real-time data-integrity verification, specifically supporting the common case of a single enterprise-class tenant-cloud relationship (i.e., a file system resident on a single cloud, although potentially a multi-tenant one). The system enables a modestly-resourced tenant, or an auditor acting on the tenant's behalf, to verify the integrity and freshness of any data retrieved from the file system.

Example embodiments of the present invention support the cloud's proposition of transparency across operational boundaries, offering an outsourced file system with a similar interface as a locally-hosted one that can be transparently layered onto any existing cloud file system. In other words, example embodiments of the present invention support all of the normal operations of a file system, but layers data-integrity on top.

Example embodiments of the present invention give continuous, cryptographic proof that the tenant's view of the file system is correct (i.e., that the cloud faithfully executes all file system operations and that no tampering, rollback, or corruption has occurred). The system supports real-world workloads and carries no trust assumptions about the cloud.

Example embodiments of the present invention support a combination of strong integrity protection and practicality for large (e.g., petabyte-scale), high-throughput file systems. Previous systems have offered one or the other (i.e., strong integrity protection or practicality), but not both. Further, example embodiments of the present invention support proofs of retrievability (PoRs) that let the cloud prove to the tenant efficiently at any time and for arbitrary workloads that the full file system (i.e., every bit) is intact, leveraging integrity-checking capabilities to achieve a property that previous PoRs lack, specifically efficiency in dynamic settings (i.e., for frequently changing data objects).

Accordingly, example embodiments of the present invention address enterprise-class tenants' most common requirements:
  Efficiency: example embodiments of the present invention achieve high throughput under operations issued concurrently by many clients;
  Scalability: example embodiments of the present invention scale to the large, petabyte-scale file system sizes required by many enterprises;
  Backwards compatibility: example embodiments of the present invention require no file system modifications, and implement file system calls in a manner transparent to clients;
  Integrity: example embodiments of the present invention ensure that data retrieved by the cloud from the portal is both authentic and fresh. Via proofs of retrievability (PoRs), example embodiments of the present invention also ensure that file system contents are retrievable (i.e., even files not explicitly downloaded by the portal are fully intact).

The ability to check data authenticity is important for enterprise compliance with a host of regulations (e.g., HIPAA 164.312 (c)(1), ISO/IEC 27002-2005 10.8.1, and NIST SP-800-53 R2 SC-1). But enabling detection of data loss or corruption is also important because of the many security and integrity problems that can arise even when cloud providers are largely trustworthy. Threats include cost-cutting by service providers (possibly resulting in deletion of data or bit rot), configuration errors and cloud infection by malware.

Accordingly, example embodiments of the present invention provide:
  A scalable authenticated data structure: Example embodiments of the present invention provide a transparent integrity layer that authenticates and provides freshness for both file data blocks and the file system directory structure. The system provides efficient authenticated data structures for both file system elements. The main techniques that enable scalability to petabyte-size file systems are:
    A balanced data structure: Example embodiments of the present invention rely on a balanced, Merkle-tree-based data structure that authenticates the file system directory tree and efficiently supports updates caused by file system operations;
    Sequential-access optimizations: Example embodiments of the present invention compact the authentication structures generated by sequential file-block accesses, the dominant access pattern in most real-world file systems; and
    Portal-side caching: Through caching strategies of the Merkle tree on the portal side, example embodiments of the present invention optimize for a key characteristic of the cloud: the relatively high latency imposed by separation of cloud resources from local clients;

Support of dynamic proof of retrievability (PoR) protocols:
Example embodiments of the present invention support a dynamic PoR protocol, one that is efficient even with arbitrary, frequent file updates. While prior work supported only static PoRs, example embodiments of the present invention achieve efficient dynamic PoR protocols by:

Piggybacking on the authenticated file system: Static PoR constructions rely on message authentication codes (MACs) that ensure the integrity of random data elements, but not their freshness. The authenticating data structure in example embodiments of the present invention support integrity and freshness checks on randomly selected data blocks. Example embodiments of the present invention can thus build on its authenticated file system to achieve dynamic PoRs;

Local storage of error-correcting data: Example embodiments of the present invention exploit the insight that enterprise-class tenants are capable of maintaining local, moderate-sized data structures. Example embodiments of the present invention incorporate a novel PoR error-correcting strategy (more precisely, erasure-coding) in which parity blocks are stored locally at the portal;

Random, sparse erasure code: To reduce the amount of error-correcting data at the portal, Example embodiments of the present invention rely on a random sparse parity structure over the file system data and metadata;

End-to-end design and implementation: Example embodiments of the present invention are engineered with several major practical considerations:

Concurrent requests: Example embodiments of the present invention support multiple clients issuing asynchronous operations to the cloud;

Storage-tier optimization: Example embodiments of the present invention are specifically optimized for the performance characteristics of hardware at different storage tiers. Example embodiments of the present invention use rotational drives for bulk data, solid-state drives (SSDs) for authentication data, and main memory for frequently modified error-correcting data and cached data on the portal;

Garbage collection: Example embodiments of the present invention employ garbage collection techniques for authenticated data structures that efficiently support file system operations such as removal of an entire directory or relocation of a directory to a new path;

Performance: Example embodiments of the present invention achieve high throughput: up to 300 MB per second for sequential accesses to files for 100 clients executing operations in parallel on the file system.

Architecture

FIG. 1 is a block diagram illustrating an architecture 100 of an example embodiment of the present invention. As illustrated in FIG. 1, the architecture 100 includes three major components: (1) one or more clients 110, a portal 120 and a storage server 140.

(1) The storage server 140 is an (untrusted) entity that maintains a file system.

(2) The portal 130 is a lightweight (trusted) entity that mediates and authenticates file system operations (i.e., file system calls) passing between the tenant (i.e., via the client 110, discussed below) and the storage server 140 and executes PoRs. In certain embodiments, the portal may be a single server because the storage server 140 handles the bulk of the computation and storage. The storage server 140 may be the "cloud."

(3) Clients 110 are tenant computing devices that operate on the shared file system stored at the storage server 140 via the portal 120. Example clients 110 may include servers, but also user machines, such as workstations or even mobile devices. Accordingly, example embodiments of the present invention support asynchronous operations issued by clients 110 to the storage server 140.

A typical enterprise-class tenant may comprise both the portal 130 and client 110. Thus, the term "tenant" is used flexibly throughout this specification to refer to the portal 120 and/or clients 110.

Clients 110 of the file system access the storage server 140 using the portal 120 as a trusted local gateway. The storage server 140 maintains the distributed file system 148 (which may be on the order of 1000 TB) according to a file system service 142, as well as some additional authentication information 150, including, as described below, MAC files and an authenticated data structure. As the network between the storage server 140 and the portal 120 (such as over a wide area network (WAN) or the Internet via the storage interface 136) has relatively high latency, the portal 120 caches 128 data locally to improve clients' 110 response time. This cache 128 also may store the root of the authenticated data structure, other nodes and some of the free list. Note that the portal stores the most recent root of the authenticated data structure by computing it itself rather than by querying the server 140, which is untrusted.

The portal 120, which operates according to a portal service 122, may also issue periodic challenges to the storage server 140 via a proof of retrievability (PoR) challenge response unit 124 to test the retrievability of file system data via a PoR. The portal 120 plays a central role in recovering from data corruptions should the tenant attempt to retrieve the file system from a corrupted state: As discussed below with respect to the example embodiment of FIG. 4, the portal 120 maintains local error-correcting information (or more concisely, parities (e.g., parities 430 of FIG. 4)) for the full file system. When corruption is detected through the PoR challenge-response protocol, and doesn't exceed the error-correcting rate dictated by PoR parameters, these parities enable recovery of lost or corrupted data.

The advantages of such an architecture 100 as opposed to a system in which clients 110 access the storage server 140 directly (i.e., without the use of the portal 120) are multifold. Foremost is the simplicity of the architecture 100. The storage server 140 provider now interacts only with a single entity (i.e., the portal 120), which isolates the storage server 140 from the complexities of organizational structure and internal access-control policies. In addition to access control, the portal 120 is also well positioned to deploy other services, such as encryption of sensitive data and enforcement of consistency semantics (e.g., sequential or causal consistency) for files shared by multiple clients 110. Moreover, batching and caching of recently accessed data at the portal 120 greatly enhances the global file system performance.

The portal 120, which is controlled by the tenant, is considered a trusted component in the sense that it executes client 110 file system operations faithfully. No trust assumption is required on clients 110; they may act arbitrarily within the parameters of the file system. However, the file system may enforce access control or file coherence policies on clients 110 through a service external to the portal.

The storage server 140, on the other hand, is presumed to be potentially untrustworthy. It may corrupt the file system in a fully Byzantine manner. The storage server 140 may alter or drop file system operations transmitted by the portal 120; it may corrupt or erase files and/or metadata; it may also attempt to present the portal 120 with stale, incorrect, and/or inconsistent views of file system data. The objective of the portal 120 is to detect the presentation of any invalid data by the storage server 140 (i.e., immediately to identify any output that reflects a file system state different from that produced by a correct execution of the operations emitted by the portal 120).

The security of example embodiments of the present invention as an authenticated file system may be specified by a game in which an adversary compromises/controls the storage server 140 and clients 120. The adversary adaptively issues client 110 requests to the storage server 140 and determines the state and outputs of the storage server 140. At a time of its choosing, the adversary causes the storage server 140 to output an invalid response to an operation requested by the portal 120 (e.g., an invalid data block, directory data, or authenticating data structure element). The adversary wins if the portal 120 accepts this response as correct. Example embodiments of the present invention ensure that the probability of success of any (reasonably resourced) adversary is negligible. That is, with overwhelming probability, example embodiments of the present invention flag as invalid any storage server 140 output reflecting an incorrect file system state. Additionally, a preferred example embodiment of the present invention never flags as invalid correct storage server 140 outputs.

Authenticated Data Structure

Figure 2:
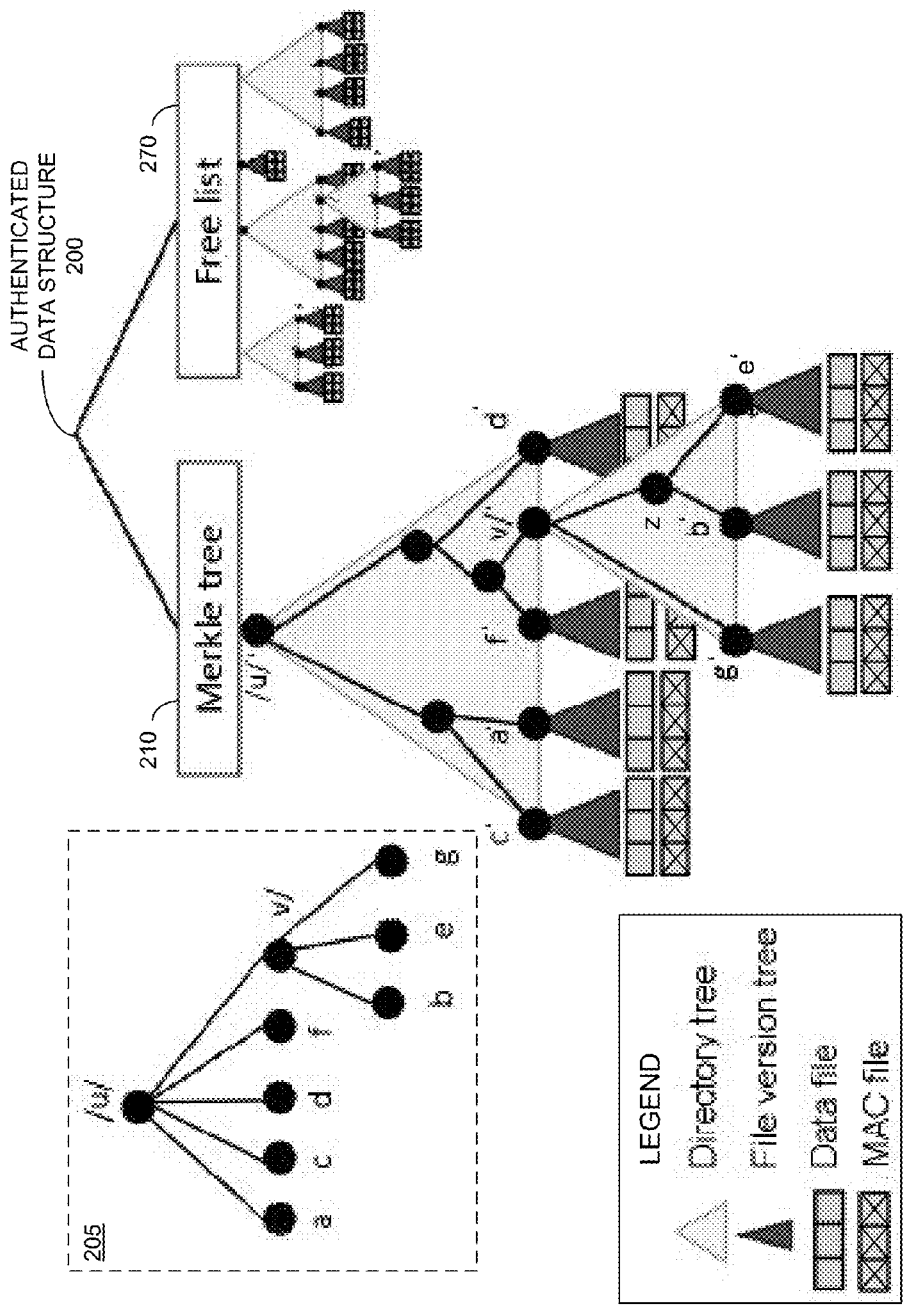
FIG. 2 is a diagram of an authenticated data structure according to the present invention.

FIG. 2 is a diagram of an authenticated data structure 200 according to the present invention illustrating a file system directory 205 on the left and its mapping to the authenticated data structure 200. Example embodiments of the present invention implement a transparent file system layer (i.e., authenticated data structure 200) that provides integrity and freshness for both file data blocks and file system metadata. The main challenge in building an authenticated file system that scales to petabytes of data is efficient management of the authenticating data-structure itself. Every file operation is reflected in this data structure 200; in tandem with the file system as a whole 205, it undergoes frequent reads and writes.

Example embodiments of the present invention employ a two-layer authentication scheme. In its lower layer, it stores on every file block a message authentication code (MAC) generated by the tenant when writing to the file system. The MACs ensure data integrity. To ensure freshness, it is necessary to authenticate not only data blocks but also their versions. It is convenient to think of each block as having an associated version counter that is incremented every time the block is modified. This version number is bound to the file-block's MAC. To protect against cloud replay of stale file blocks, the freshness of version counters must be authenticated.

The upper layer of the authenticated data structure 200 is a data structure, such as a balanced Merkle tree 210, that protects the integrity of the file-block version counters. Alternatively, a B-tree, a classical tree or a red/black tree may be used. This data structure 210 embeds the file system directory tree 205. Attached to each node a'-g' representing a file a-g is a sub-tree (i.e., a version tree) containing file block version counters.

Merkle Tree

This Merkle-tree based structure 210 includes two main features: (1) tree balancing; and (2) sequential access optimization. Preferred embodiments of the present invention maintain a balanced binary tree over the file system directory structure 210 to efficiently support existing file system calls (i.e., searches or accesses are logarithmic in a binary structure rather than linear). Further, example embodiments of the present invention optimize for the common case of sequential file-block accesses in which sequences of identical version counters are compacted into a single leaf.

It should be understood that compact design of the Merkle tree 210 is preferred. The tree 210 exhibits random access patterns, given that many parts of the file system 205 may be in current use. Thus, for efficiency, example embodiments of the present invention store the Merkle tree 210 (on the storage server 140 side) in bulk storage that supports efficient random access—in particular (i.e., a solid-state drive (SSD) 452 of FIG. 4).

As illustrated in FIG. 2, to authenticate file system metadata or the directory structure of the file system 205, the data structure 200 transforms the file system directory tree 205 into a Merkle tree 210 in which every directory (i.e., /u/, v/) is mapped to a directory subtree (i.e., /u/', v/'). Each directory tree (i.e., a subtree in the larger Merkle tree) is a balanced tree whose leaves represent the directory's files and subdirectories.

Mapping the authenticated data structure 200 on the existing file system tree 205 efficiently supports file system operations like a delete or move of entire directories (e.g., such as to the free list 270). However, with this mechanism, directories with a large number of files and subdirectories (e.g., on the order of hundreds of even thousands of entries) will be mapped to a directory subtree containing nodes of high degree. Such high-degree directory subtrees induce a high overhead for integrity verification, as well as for updates to the file system 205, due to the Merkle tree structure in which a node contains the hashes of all its children, as described below. To reduce this unnecessary overhead, example embodiments of the present invention create a balanced binary tree for each directory that contains file and subdirectory nodes in the leaves, and includes intermediate, empty internal nodes for balancing. For example, if a new file h were being added to the file system within directory v/, the node g' representing file g may be replaced with an intermediate node having two children, a new node g' representing file g and a new node h' representing file h, thereby maintaining a binary tree and, by expectation over a number of random accesses (i.e., creates and removes), producing a balanced tree.

Each directory in the file system tree 205 is mapped to a directory tree (i.e., a subtree in the Merkle tree 210). To reduce the cost of integrity checks and updates for directories containing a large number of files and subdirectories, each directory tree is constructed as a balanced binary search tree. Files and subdirectories of a given directory correspond to leaves in this tree 210. Other nodes in the tree are intermediate nodes needed to construct a balanced structure. Nodes in a directory tree have unique identifiers assigned to them, chosen as random strings of fixed length.

A leaf for each file and subdirectory is inserted into the directory tree 205 in a position given by a keyed hash applied to its name and its parent's identifier. This ensures that the position in which each file or directory is inserted is distributed (heuristically) uniformly at random, thereby creating a probabilistically balanced structure. Among the leaves in a directory tree, a file node serves as the root of its dependent file-version tree, while a directory node serves as the root of its dependent directory subtree.

Accordingly, a file node in the directory tree corresponding to a file F stores: (1) a unique file identifier ($id_F$); (2) a value $rank_F$ denoting the number of file blocks in the file F; and (3) the root of the dependent file-version tree Root-$VT_F$. A directory node associated with directory D stores: (1) the directory identifier $id_D$; (2) a value rank denoting the total number of file blocks in the directory; and (3) the root of the directory tree Root-$DT_D$. An internal (i.e., intermediate) node N in a directory tree stores: (1) its node identifier $id_N$; (2) the value $rank_N$, computed as the total number of file blocks in the subtree rooted at N; and (3) a hash $h(id_N, rank_N, hleft_N, hright_N)$, where $hleft_N$ and $hright_N$ are the hashes of the left and right children. Thus, for example, file node c' stores its unique file identifier $id_c$ (i.e., c), the number of blocks in c $rank_c$ and the root of c's file version tree Root-$VT_c$. Further, for example, directory node v/' stores its unique directory identifier $id_{v/}$, the number of blocks in directory v/$rank_{v/}$ (i.e., in files b, e and g) and the root of the directory tree for files b, e and g Root-$DT_{v/}$. Moreover, for example, intermediate node z stores its unique node identifier $id_z$, the number of blocks in its subtree $rank_z$ (i.e., in files b and e) and a hash of $id_z$, $rank_z$, a hash of node b' (which, as described above, as a file node, stores $id_b$, $rank_b$ and Root-$VT_b$) and a hash of node e' (which, as described above, as a file node, stores $id_e$, $rank_e$ and Root-$VT_e$).

A directory tree supports the following operations. Clients 100 can attach or detach file system object nodes (i.e., files or directories) at certain positions in the tree 210 (e.g., operations attach-dir-tree and detach-dir-tree). Those operations trigger updates of the hashes stored on the path from the attached/detached node up to the root of the tree 210. Detached subtrees are added to the free list 270, as explained below. With operation search-dir-tree, clients 100 can search a particular file or directory in the data structure 200 given its absolute path name $d_1 \ldots d_k$, where $d_k$ might be a directory or a file. The search traverses the authenticated Merkle tree 210 from the root following each directory tree from the path. On reaching node $d_i$, the search key of $d_{i+1}$ is computed as the keyed hash of the node identifier stored at $d_i$ and the name $d_{i+1}$. As described above, such a search is logarithmic rather than linear as a result of the binary nature of the tree.

An operation randompath-dir-tree for directory trees is used to implement the challenge-response protocols of the PoR system, as described below. A random path in the tree is returned by traversing the tree from the root, and selecting at each node a child uniformly at random, weighted by rank. In addition, the authentication information for the random path is returned. Accordingly, the authenticated data structure 200 supports strong authentication of both the directory structure and file blocks, while providing random access to files, and preserving the efficiency of existing file system operations. The data structure 210 can be layered on top of any existing file system 205 to provide integrity and freshness guarantees with minimum overhead.

Block-level MACs

As will be described below in greater detail, the authenticated data structure 200 includes a block-level message authentication code (MAC). Each data file in the file system 205 has an associated file containing MACs on each of its constituent blocks. These MACs incorporate the block versions authenticated in the file's file-version subtree. Moreover, internal (i.e., intermediate) nodes in the Merkle tree contain hash values computed over their children, as well as some additional information (e.g., node identifiers, rank, etc.). For example, sibling nodes are read and hashed together to get a parent node. This processes is repeated recursively, with that parent node and its sibling being hashed to get its parent (i.e., the grandparent) node.

For each file F consisting of n file blocks $F=b_0 \ldots b_{n-1}$ of fixed size (e.g., 4 KB), a MAC file m0 $\ldots m_{n-1}$, with $m_i = MAC_{kd}(id, i, v_i, b_i)$ may be stored, where $k_d$ is a (secret) MAC key held by the portal. The MAC $m_i$ of each file block is generated using a message-authentication code keyed by $k_d$ and is computed over the file identifier id (a unique, randomly chosen identifier of fixed length), block index i, block version number $v_i$ and actual block contents $b_i$. MAC files provide basic data integrity, but are not sufficient for data freshness (i.e., ensuring that the latest version of a data block is retrieved). For data freshness assurances, the file block version number may be included in the authenticated data structure in a compressed form.

Free List

In addition, as an optimization, the data structure 200 may maintain a free list 270 comprising pointers of nodes detached from the Merkle tree (i.e., subtrees that are removed as part of a delete or truncate operation). The purpose of the free list is to defer garbage collection of deleted nodes and efficiently implement remove and truncate file system operations. Moreover, as will be discussed below, a parity structure may be provided over file blocks of the file system and those represented by the free list, including not only the Merkle tree but also the free list (i.e., the parity structure is over the root of the authenticated data structure 200). Therefore, removing a subtree from the Merkle tree would require an adaptation of the parity structure of the entire removed subtree, thereby resulting in an inefficient burst of calculations. Rather, by moving removed subtrees from the Merkle tree to the free list, the costs of recalculating the parity structure may be amortized over multiple write operations while creating files and repurposing the data from the removed subtrees back into the Merkle tree (i.e., modifying the removed file blocks and accordingly adapting the parity structure of only those modified file blocks).

The free list 270 is an optimization for efficient garbage collection of subtrees detached from the tree as a result of certain file system operations (e.g., removal or truncation of files or directories). In addition, the free list 270 enables lazy updates to parities stored on the client portal. The free list 270 is organized as a linked list containing pointers to roots of detached nodes authenticated with a unique counter.

The client portal 120 maintains two counters, head-ctr and tail-ctr associated with the head and tail of the free list 270, respectively. When a subtree rooted at node R is detached from the Merkle tree 210, tail-ctr is incremented and a message authentication code $MAC_{kl}$ (R, tail-ctr) (keyed by a key $k_l$) is added to the free list (operation add-free-list). The entire detached subtree R, including the file data blocks, and MAC files are also added to the free list. For example, the deleted files are moved to a special directory.

The free list also maintains two pointers: The free ID pointer and the data pointer. In order to reuse node identifiers, the free list supports an operation fetch-id-free-list that returns the identifier of the node pointed by the free ID pointer and advances the pointer. The free ID pointer traverses the subtrees from the free list in a standard traversal order (inorder). To enable lazy update of parities, data blocks can be fetched from the free list using operation fetch-block-free-list. The data pointer is advanced to the next data block in the free list. In both operations, the returned identifier or data block are checked for integrity using the MACs stored in the free list.

Once the random identifiers and data blocks from a full subtree rooted at node R in the free list have been fetched, that subtree is removed from the free list with operation remove-free-list. First $MAC_{kl}$ (R, head-ctr) is checked, and then the counter head-ctr stored on the portal is incremented. This process is called garbage collection and can be performed on demand (e.g., when disk space is needed for new files) or, in order to not impact the normal operation of the file system, during periods of low activity. As with file-version trees and directory trees, the free list supports an operation random-path-free-list that chooses uniformly at random a node from the free list and returns its authentication information.

File Version Tree

As will be described below in greater detail, the authenticated data structure 200 includes a file-version tree for each file. Each file of the file system corresponds to a leaf in its directory tree. This node, however, also serves as the root of an attached file-version tree (i.e., subtrees hanging at the bottom of the Merkle tree). File blocks have version numbers. Accordingly, as some parts of a file get updated more regularly than other parts, the leaves in the version number tree represent consecutive ranges of file blocks all having the same version number. The file blocks have metadata that links them to the leaf of the version tree that has the range of which they are part.

There are several options for authenticating individual file blocks to support random access to files. For example, a Merkle could be constructed tree per file containing the hashes of file blocks in the leaves, and attach the root of the tree in the corresponding file node in the directory tree. However, this design results in a Merkle tree per file of size linear in the file size.

Rather, a file version subtree per file authenticates version numbers for all file blocks in a compressed form. Briefly, the file version tree compresses the versions of a consecutive range of blocks into a single node, within which is stored the index range of the blocks and their common version number. File version trees are optimized for sequential access to files (e.g., if a file is always written sequentially then its file version tree consists of only one root node). To provide file block integrity, a MAC file per file may be stored containing a MAC of each file block together with the block's version number. This mechanism provides integrity and freshness for individual file blocks and reduces the amount of expensive random access storage needed for the authenticated data structure.

Figures 3A, 3B:
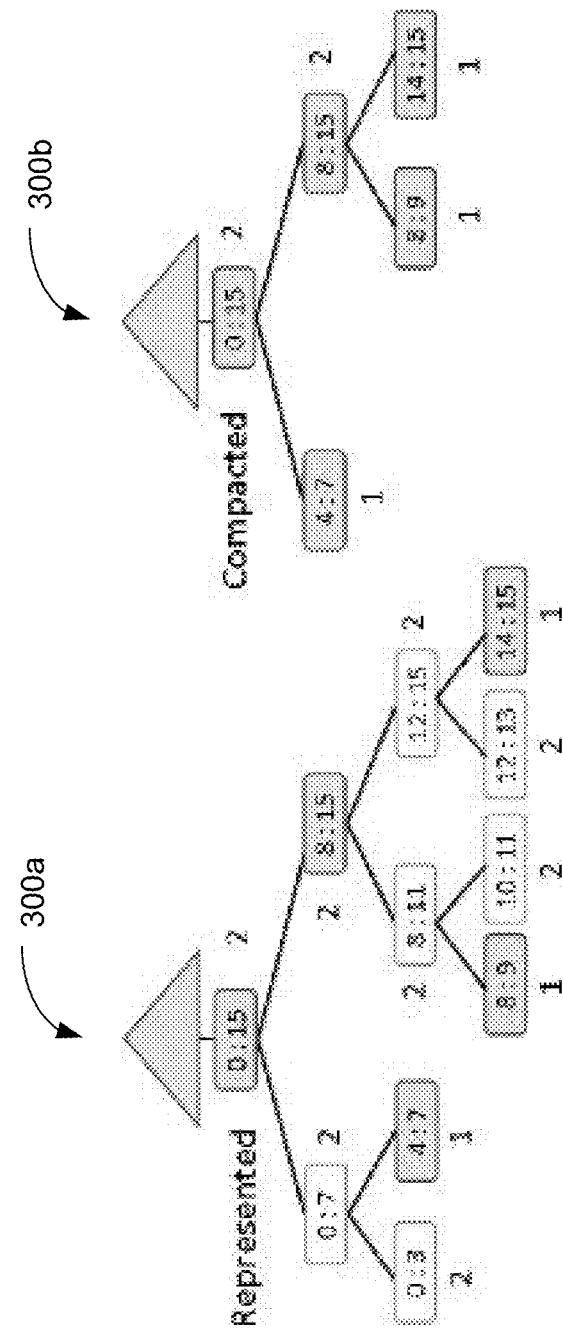
FIGS. 3A-3B are diagram of a file version tree and a compacted file version tree, respectively.

FIG. 3A is a diagram of a file version tree 300a for a file with 16 blocks. Each file-version tree 300a authenticates block version numbers. Each node in the file-version tree 300a corresponds to a range of file blocks (indicated by the numbers within the nodes) with the same version number (either below or beside the nodes). For instance, the root node covers the range $[0:2^m-1]$, where $2^m-1$ is the smallest power of two greater than n, the number of file blocks. Nodes at level i in the subtree correspond to an interval of size $2^{m-i}$. As illustrated in FIG. 3A, blocks 0-3 and 10-13 have been written twice, with all other blocks having been written once.

FIG. 3B is a diagram of a compacted file version tree 300b. White nodes from FIG. 3A are removed in the compacted version on the right. Version numbers are adjacent to nodes. Each leaf node stores the version number of the covered blocks. An internal node in the file-version tree 300b stores the maximum version number of the file blocks in its subtree. The file-version tree 300b is maintained in compacted form whenever possible and may require periodic compacting.

As illustrated in FIGS. 3A-3B, each node in the tree 300a, 300b (generally, 300) is assigned a unique, random identifier of fixed length. A leaf L in a version tree 300 of file F stores its unique identifier $id_L$, the covered range of file blocks [l-range$_L$, r-range$_L$], and the version number ver$_L$ of those blocks. An internal node N stores its unique identifier $id_N$, the range of blocks it covers [l-range$_N$, r-range$_N$], the maximum version number ver$_N$ of all blocks in the subtree rooted at node N and a hash h($id_N$, l-range$_N$, r-range$_N$, ver$_N$, hleft$_N$, hright$_N$) where hleft$_N$ and hright$_N$ are the hashes stored at the left and right children of N, respectively. Updates of nodes result in hash updates on the path to the root as in a standard Merkle tree. Verification of a version number is done by checking the search path from the root to the leaf or internal node where the search stops.

File system operations may impact file-version trees. File-version trees can be extended to the next power of two after an append operation that extends the file beyond $2^{m-1}$ blocks (in an operation called append-ver-tree). As an optimization, when a node is appended to the tree, its version number is the same as the last file block (in order to create a longer contiguous sequence of blocks with the same version number). Trees can also shrink to a smaller power of two as a result of a truncate operation that detaches blocks from the end of the file (in an operation called truncate-ver-tree). To search for a block index (operation search-ver-tree), the tree is traversed from the root up to a leaf or last internal node that contains that block index in its covered range.

File-version trees also change as a result of a write operation. Assume that a contiguous sequence of blocks [u:v] in file F are written. First, all subtrees in the version tree of file F spanned by the range [u:v] are detached and added to the free list. Let r be the root of the minimal subtree that covers all detached subtrees. Second, the subtree rooted at r is recreated with the updated version numbers and then it is compacted if needed.

Operation compact-ver-tree compacts a file-version tree recursively in two steps. First, all leaves that have the same version number as their parent are removed. Second, leaves that are single children and have the same version number as their parent are compacted with their parent (moved in the position of their parent). The process is repeated until all leaves have a different version number than their parent.

In addition, file-version trees support an operation called randompath-ver-tree that samples a node together with its authentication path uniformly from the authenticated data structure. This feature is needed for implementing the challenge-response protocols of a PoR system. In randompath-ver-tree the tree is traversed starting from the root and at each internal node a child is selected with probability given by its rank. When reaching a leaf, the algorithm returns a node covered by the leaf chosen at random together with its authentication path.

Security Analysis

Security of the system derives from the Merkle tree and associated MACs. An adversary is best modeled as an entity that controls both the storage server 140 and clients 110. The adversary adaptively issues a sequence of file system requests to the portal 120. At some point, the adversary generates an invalid response from the storage server 140 (e.g., a corrupted or stale data block or metadata information) in response to a portal 120 operation request. The adversary succeeds if the portal 120 accepts the operation as valid with non-negligible probability.

Integrity of file data is enforced by MACs on data blocks. Freshness is enforced by the block version numbers incorporated into these MACs. Note that MACs also include file handles and within-file positions to protect against block-swapping attacks. The Merkle tree enforces authenticity on version numbers and the directory structure. The portal 120 generates MACs and retains the MAC key. Thus, it is infeasible for the adversary to produce a data block with an invalid MAC and generate an existential forgery.

The adversary might instead attempt to transmit a stale block to the portal 120 (i.e., one with an old version number). While the portal 120 processes client 110 requests, however, it performs an update to its locally stored Merkle-tree root. Thus arises a key invariant: the Merkle tree root stored by the portal 120 always captures the correct, current state of the entire file system. As the portal 120 verifies all Merkle-tree paths presented by the cloud up to this root, it is consequently infeasible for the adversary to cause the portal 120 to accept an invalid version number. The portal's storage of the Merkle tree root confers the same authenticity assurance on the directory structure, which is also embedded in the Merkle tree.

Implementation

Figure 4:
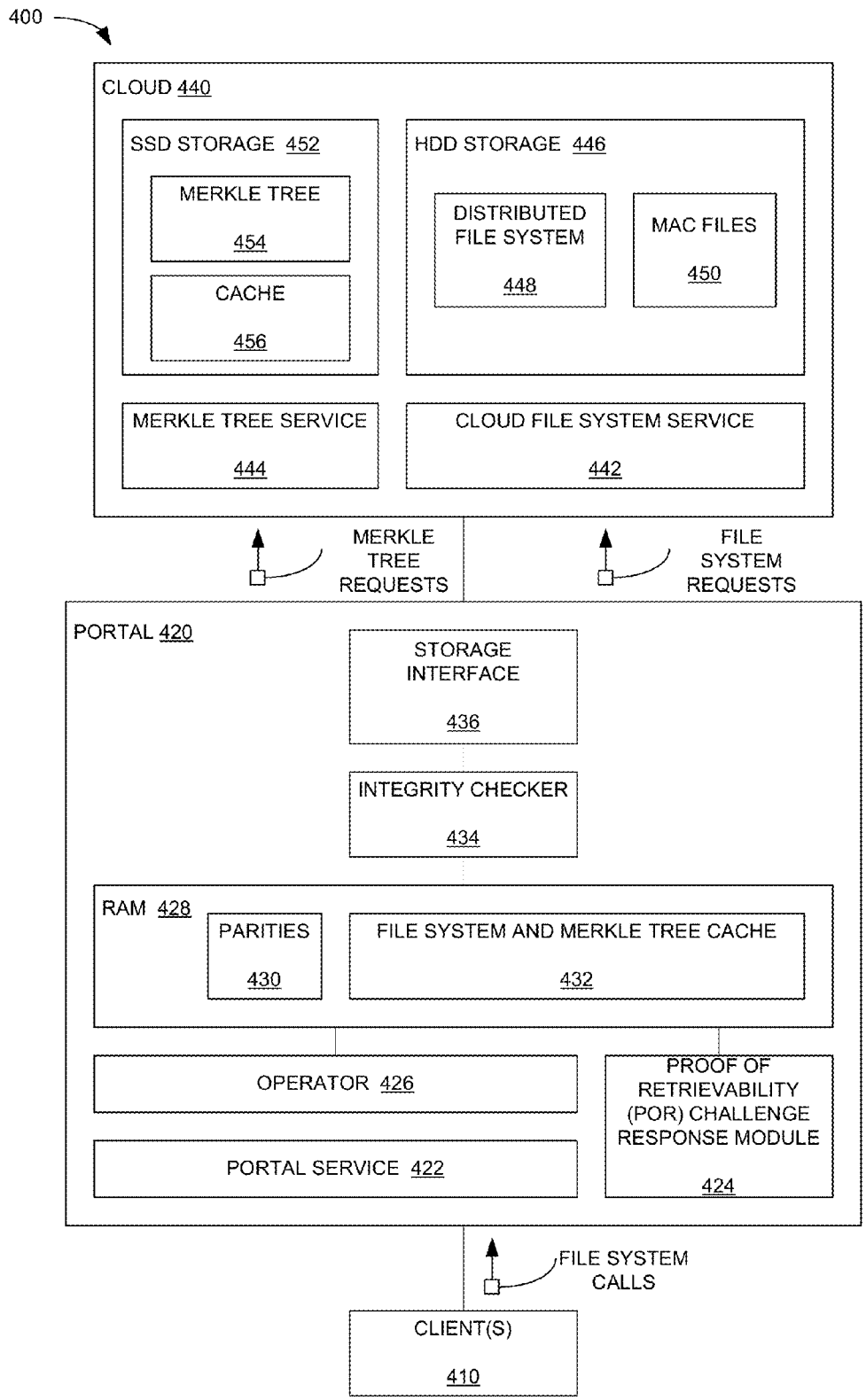

FIG. 4 is a block diagram of a detailed system architecture 400 according to an example embodiment of the present invention. The integrity functionality of example embodiments of the present invention may be implemented in user space as a transparent layer that can enhance any existing file system employed by the cloud 440 provider. For example, the open-source .NET framework Mono may be used, which has the advantage of platform independence (i.e., it can run on Linux ext3, NTFS, and even MAC OS).

Cloud

The cloud 440 stores not only the distributed file system 448 data, via a cloud file system service 442, but also additional authenticating metadata. This includes MAC files 450, which may be stored in rotational based storage (i.e., hard disk drives (HDDs) 446), and the Merkle tree authenticated data structure 454, via a Merkle tree service 444, which may be stored on solid state disks (SSDs) 452. The SSD storage 452 also may store a cache for the Merkle tree 454.

Unlike typical files, which mainly undergo sequential access, the Merkle tree is subject to random access patterns. There is no effective sequential layout for Merkle tree paths; additionally, client operations in different parts of the directory structure induce non-sequentiality. Thus, as an optimization, example embodiments of the present invention store the Merkle tree on SSD storage 452. SSDs are considerably more expensive than rotational drives; however, they are much more efficient for random accesses and are cost-effective given the relatively small size of the Merkle tree.

The portal 420 performs reads and writes to the various data repositories (i.e., distributed file system 448, MAC files 450 and Merkle tree 454) by invoking their respective cloud-side services (i.e., cloud file system service 442 and Merkle tree service 444). In certain embodiments, the portal 420 may be the client 410. The Merkle tree service 444 handles the Merkle tree requests and maintains a cache 456 with the mapping from node identifiers to locations on drive for the recently requested tree nodes. The cloud file system service 442 is responsible for requests for file blocks and MAC files, stored, for example, in a New Technology File System (NTFS) file system. Operations on file blocks are executed asynchronously at the portal 420 and sequential access operations to the same file could potentially arrive out-of-order at the cloud 440 (note that the portal 420 and cloud 440 machines may be equipped with multiple (e.g., three) network cards to enable re-ordering in transit on the network). To reduce disk spinning, the cloud file system service 442 orders requests to the same file increasingly by the block offset.

Portal

The portal 420 interacts with multiple clients 410. Clients 410 issue file system calls to the portal service 422. The portal 420 executes client 410 operations asynchronously and in parallel. For each file system operation, a new operator 426 process is spawned by the portal service 422. These operators 426 request and update file data blocks and metadata information from the file system 448.

All data and metadata blocks requested by active operators 426 are downloaded from the cloud 440 via the storage interface 436, and stored in the file system and Merkle tree cache 432 in the portal 420. While in use by an active operator 426, blocks are retained in the cache 432. Prior to being cached, however, blocks downloaded from the cloud 440 into the portal cache 432 are checked for integrity by the Integrity Checker 434 component.

The file system and Merkle tree cache 432 in the portal 420 performs a complex function including the caching strategy for recently accessed blocks and portions of the tree on the portal 420. The cache 432 must maintain locks on cached data and tree nodes to ensure data consistency across asynchronous client operations.

Example embodiments of the present invention benefit from multi-core functionality available in most modern computers. Operations that need to be performed on active blocks in the cache 432 are split into atomic operations (e.g., hash update for a tree node, check MAC for a data block or compact nodes in version trees). These are inserted into various priority queues maintained at the portal 420. Multiple threads seize blocks from these queues, lock them and execute the atomic operations. When executing operations in parallel, a real challenge is to handle dependencies among tree nodes and maintain data structure consistency. To help ensure consistency, example embodiments of the present invention impose several orderings of operations: integrity checking for tree nodes may be performed in a top-down fashion (i.e., a parent node is verified before its children), and hash updates of tree nodes may be performed bottom up (i.e., the hash for a parent is updated after the children hashes).

For cache eviction, example embodiments of the present invention implement a simple least recently used (LRU) policy in which blocks that have not been recently accessed (e.g., for a fixed time interval) and are not referenced by any active operator are evicted from the cache. When the system is under heavy utilization, the cache size can increase above the maximum allocated size, requiring adjustment to the eviction time interval. Tree nodes are evicted from the cache in a bottom up fashion, starting from tree leaves up to the root. Before a tree node is evicted from the cache, its hash is updated (e.g., if the node has been modified while cached), and the node is uploaded into the cloud 440. Data blocks evicted from the cache trigger an update to their MAC if they have been modified.

Proof of Retrievability

Another component of the portal is the PoR Challenge/Response module 424. This service, periodically invoked by the portal 420, transmits a PoR challenge to the cloud 440 and receives and verifies the response, consisting of a set of randomly selected data blocks in the file system 448 and their associated Merkle tree paths. The portal 420 also maintains a repository of parities 430 to recover from file system corruptions detected in a PoR, seen in the portal cache module 432. Parities 430 undergo frequent modification. Accordingly, multiple parities 430 are updated with every file-block write. Thus, the parities 430 sit in the main memory (e.g., RAM 428) of the portal. Additionally, the portal 420 can include a checkpointing service that backs up data stored in the main memory 428 at the portal 420 to local permanent storage. To enable recovery in the event of a portal crash, checkpointed data could be periodically transmitted to the cloud 440.

Existing PoR protocols are designed to test the retrievability of a single file that cannot be modified after the encoding phase. Accordingly, in order to design a PoR protocol that efficiently supports dynamic updates, it is helpful to discuss some inefficient constructions of a dynamic PoR protocol and then describe the technical contributions (consisting of system architecture design and new coding-theory techniques)

enabled by example embodiments of the present invention that provide a practical dynamic PoR protocol for a large file system.

Inefficient Dynamic PoR Protocols

Previously proposed PoRs assume thin clients that store error-correcting data (i.e., parity blocks) on the server side. For example, in existing static PoR protocols, an error correcting code that can correct a fraction α of erased or corrupted blocks is applied to a file F during the encoding phase. Maximum-distance separable (MDS) codes, such as Reed-Solomon codes, are attractive as they provide maximum information rate (i.e., least redundancy). However, using an MDS code in the PoR encoding phase will result in an update cost proportional to αn, where n is the number of file blocks, since all parity blocks have to be updated with each block update. Although, it is possible to design a dynamic PoR protocol in which every block update results in an update of all parity blocks, such a protocol provides linear update costs in terms of both computation and communication costs and is therefore impractical, especially for terabyte or potentially petabyte file systems.

On the other hand, if a non-MDS code is used during the PoR encoding phase, parity blocks only depend on a fraction of file blocks. Nevertheless, this will not necessarily result in a lower update cost because the code structure cannot be revealed to the server (e.g., the mapping from file blocks to parity blocks (i.e., an adversarial server with knowledge of the mapping can target few message blocks and corresponding parity blocks to corrupt the encoded file with a low detection risk). The error-correcting-code structure must therefore be randomized to prevent an adversarial server from introducing targeted, undetectable file corruptions. For this reason, simply updating a file block and the corresponding parity blocks when performing an update operation is not practical. To conceal the randomized code structure during file updates in a dynamic PoR with server-side parity-block storage, the client would need to update all parity blocks or employ an oblivious RAM protocol. However, such updates would impose impractically heavy bandwidth and server-side file-access requirements that are prohibitively expensive for a high-latency system model.

In any PoR, the verifier (e.g., tenant) samples and checks the correctness of random file elements retrieved from the prover (e.g., cloud). This sample-and-check procedure enables the verifier to detect any large-scale corruption or loss in the file. To recover from small-scale file damage, which sampling may or may not detect, an error-correcting (i.e., erasure) code is maintained over the file. A PoR gives a strong guarantee that the full file can be extracted (i.e., recovered through the sample-and-check/challenge-response interface). Further, a PDP does not involve error-correction or extraction and therefore provides weaker assurances.

PoR Protocol

Even with locally-stored parity blocks at the portal, designing an erasure code with the combined properties of randomized code structure and efficient block updates raises several technical challenges. Existing erasure codes together with their decoding algorithms, including MDS-codes (e.g., Reed-Solomon) or low-density parity-check (LDPC) codes (e.g., Turbo codes, Raptor codes) fall short of providing the following properties of the dynamic PoR protocol:

The erasure code systematically encodes a very large message of maximum size n blocks (i.e., the message is the entire file system together with the data structure) into a codeword, by appending a number of parity blocks to the message blocks;

The code supports updates efficiently (i.e., update of a message block results in a small number (given by parameter u) of parity block updates). Also in the preferred example embodiment, the code encodes messages whose size gradually increase over time and is scalable to potentially very large messages;

The mapping from message to parity blocks is randomized and not revealed to the server during updates;

The total size of the parity structure is constrained to a parameter s, limited by the size of available memory at the portal side; and An exponentially small upper bound on the decoding failure probability under practical parameter settings is required.

Figure 5:
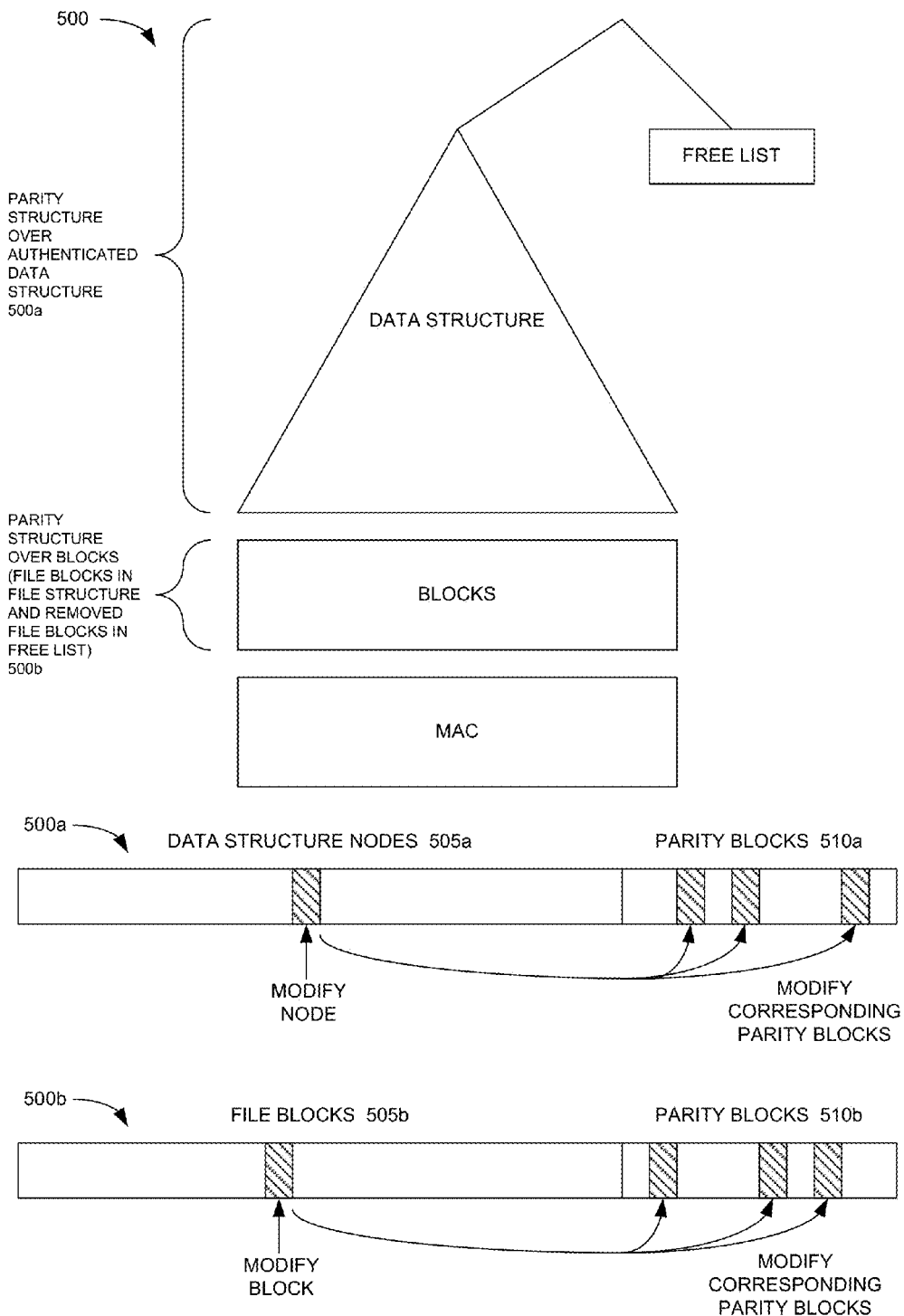
FIG. 5 is a block diagram illustrating a parity structure according to an example embodiment of the present invention.

Example embodiments of the present invention construct a dynamic PoR protocol in which files can be frequently updated after encoding. Moreover, the dynamic PoR over a file system of example embodiments of the present invention provides guarantees about the integrity and retrievability of an entire (potentially extremely large) file system. An efficient dynamic PoR protocol, according to an example embodiment of the present invention, leverages two main ideas:

(1) Example embodiments of the present invention use the authenticated data structure 200 to check the integrity and freshness of file blocks during the challenge-response and recovery protocols. This relaxes the requirements on the parity structure used to encode files (i.e., because the correctness of file blocks can be verified, the exact position of errors is known during recovery). Thus, an erasure code may be used during encoding instead of an error-correcting code. Note, however, that, as illustrated in FIG. 5, illustrating a parity structure 500 according to an example embodiments of the present invention, the data structure blocks (i.e., file system metadata) need to be challenged and protected with the erasure code (thereby requiring a parity structure over the nodes of the data structure 500a) in addition to the data blocks (which also require a parity structure over the file blocks 500b), as the data structure is maintained by the server and is prone to corruption. Accordingly, the parity structure over the data structure 500a includes a set of sparsely populated nodes 505a and a set of sparsely populated parity blocks 510a. Likewise, the parity structure over the file blocks 500b includes a set of sparsely populated blocks 505b and a set of sparsely populated parity blocks 510b. For both parity structures 500a, 500b, a modification (other than a delete) to a data structure node ID or a file block results in a modification of corresponding parity blocks.

(2) Even modestly-resourced tenants can maintain several GBs of data locally in their main memory. Therefore, to reduce the bandwidth costs during updates, the parity structure is designed to fit into the memory of current typical architectures. For example, for a file system of 1 PB of data (i.e., resulting in $n=2^{38}$ blocks of size 4 KB), the parity structure may be tailored to be of size $8\sqrt{n}=2^{22}$ blocks, resulting in about 16 GB total size.

The Challenge-response Protocol

The portal 420 challenges the cloud 440 to return a set of c randomly selected file system data blocks from the file system 448. As an optimization, in a particular embodiment, the portal 420 transmits a seed from which the challenge set is pseudo randomly derived. Since the portal 420 does not store file identifiers and their sizes, the portal 420 cannot use these in selecting random blocks. In order to select a random block, the portal 420 gives the cloud 440 an arbitrary number r in the interval [1, n]. For example, if the file system 448 stores t blocks in total, then the portal 420 later verifies that the ⌈rt/n⌉-th block is returned.

The c selected random blocks together with the authenticating paths from the authenticated data structure 200 are transmitted back to the portal 420. The portal 420 verifies the correctness of the responses. These involve two checks: (1) The integrity and freshness of selected blocks by checking the MACs and path to the root; and (2) whether the blocks have been correctly indexed by the challenges according to the node ranks/weights, which proves that the file system data blocks are selected with uniform probability. As a consequence of these checks, the challenge response protocol also verifies the integrity and freshness of the blocks that store the authenticated data structure itself (i.e., if a fraction α of file system data blocks do not verify correctly, then at most a fraction α of the nodes in the Merkle tree 210 and free list 270 and its subtrees are missing or incorrect).

Erasure Coding

Example embodiments of the present invention store error-correcting data locally at the portal 420 rather than remotely in the cloud 440. However, in a preferred embodiment, the error-correcting code structure is randomized to prevent targeted file corruption by an adversarial cloud. The combined qualities of randomized structure and efficient parity-block updates create two complications: (1) The probability of successful decoding of the error-correcting code requires mathematical analysis; and (2) The size of the error-correcting code (i.e., number of parity blocks) must be carefully parameterized because the need for frequent updates to the file system means that parity blocks must fit in the main memory of the portal server. It should be noted that the additional requirement for a PoR of the ability of the tenant/portal to sample file data blocks uniformly at random, which is supported by the authenticated data structure for the file system.

In a PoR protocol according to an example embodiment of the present invention, a client 410 applies an encoding algorithm to a file and archives the encoded file at a remote server (i.e., the cloud) 440. At a later time, the client uses a challenge-response protocol periodically to obtain a probabilistic guarantee that at most a fraction α of all stored file blocks is missing or corrupted. The missing and corrupted blocks lead to erasures and errors during file recovery. A small fraction of erasures and errors (i.e., less than α) can be recovered with an erasure code applied to the file during encoding. The property guaranteed by the PoR protocol is that if the file is encoded with a code that can correct a fraction α of erasures and errors and if the server replies successfully in the challenge-response protocol, then the client has a high probability (i.e., greater than 1−ρ, of recovering the full file. The PoR protocol is parameterized by α and ρ.

Given an erasure code that can correct a fraction α of erasures, the storage needed for parities is at least s >αn blocks. The storage size s is limited by the sizes of current memories to s=O($\sqrt{n}$) and thus α=O(1/$\sqrt{n}$). To obtain a probabilistic guarantee that at most a fraction α of all stored file blocks is missing or corrupted, the client challenges c=O(1/α)=O($\sqrt{n}$) arbitrarily selected file blocks during a challenge-response protocol to which the server needs to respond with the correct file blocks (verified by the client using the authenticated data structure).

In order to support updates efficiently, the huge codeword may be split into m≈αn stripes, with each stripe being a code word itself with p parities. With high probability each stripe is affected by only O(log n) erasures. Therefore, to be able to correct and recover stripes, each stripe needs p=O(log n) parity blocks, leading to s=O(αn log n)=O($\sqrt{n}$ log n) memory. Striping has the advantage that each write only involves updating u=O(log n) parities within the corresponding stripe. A sparse parity structure enables reduction of u to O(log log n).

Sparse Code Construction

Sparse erasure code is based on efficient XOR operations. Although it is probabilistic (as opposed to deterministic) in that successful erasure decoding is not guaranteed for any number of erasures, its advantage is that it is a binary code and scalable to large code word lengths. Updates only require one hash and u=O(log n) XOR block operations.

For the purpose of erasure coding, data blocks or tree nodes may be viewed as identifier-value pairs δ=($\delta_{id}$; $\delta_{val}$), where $\delta_{val}$=($\delta_1$, ..., $\delta_b$) is a sequence of b bits $\delta_1$, ..., $\delta_b$ and $\delta_{id}$ is a unique identifier. To randomize the mapping from data blocks to parity blocks, a keyed hash function $H_k$(.) may be used that maps an identifier $\delta_{id}$ to a pair ($\theta_{ind}$, θ), where $\theta_{ind}$ is a random stripe index and θ=($\theta_1$, ..., $\theta_p$) is a binary vector of p bits.

The 1s in vector θ indicate which parity bits need to be updated whenever δ is updated; at most u out of the p parities of the stripe to which δ belongs should be updated. That is, $H_k(\delta_{id})$ is designed to produce a binary random vector θ of length p with at most u entries equal to 1. For u=O(log p)=O(log log n) this leads to a sparse erasure code that still permits decoding, but enables many fewer parity updates than a denser parity structure.

Encoding

During encoding, the portal 420 constructs two parity structures: one erasure code is computed over the file system data blocks (i.e., the file blocks that correspond to the Merkle tree 210 and the removed file blocks that correspond to the free list 270 and its subtrees) and a second erasure code is computed over the nodes in the Merkle tree 210 and free list 270 (i.e., including the subtrees whose roots constitute the free list). Updates over the lifetime of the file system 205 induce updates to the locally stored parity blocks.

Accordingly, the sparse erasure code computes the parities over file blocks and Merkle tree nodes. The code structure (i.e., mapping of data blocks to parity blocks) may be randomized to prevent an adversarial server from introducing targeted, undetectable data corruptions into the file system on the cloud side. In order to reduce the update cost, a multi-stripe structure may be used as described above. (i.e., the file system is divided into m stripes, and each stripe is viewed as a codeword with p parity blocks). An update to a file block or tree node induces updates to u≤p parity blocks. It is advantageous to minimize u, as well as s (i.e., the total storage for all parities at the portal).

A parity matrix P[i] may be maintained for each stripe i, 1≤i≤m. To add a block δ to the parity structure, the portal computes $H_k(\delta_{id})$=($_{ind}\theta_{ind}$; θ); constructs A=δval(x)θ={$\delta_i\theta_j$}$_{i=[1,b],j=[1,p]}$; and updates $P[_{ind}\theta_{ind}] \leftarrow P[_{ind}\theta_{ind}]$(x)A.

Similarly, to remove a block from a parity structure, the portal computes ($_{ind}\theta_{ind}$; θ) and matrix A as above. It then updates the corresponding parity structure for the selected stripe.

Since vector θ has at most u non-zero positions, the number of XOR operations for adding and subtracting a block from the parity structure is u. The total storage for all parities is s=b·pm bits.

Decoding

Erasure decoding of the multi-striped structure consists of decoding each stripe separately. Successful decoding involves m times a Gaussian elimination, each time computing the right inverse of a (≤p)×p matrix costing at most $p^2$=O $((\log n)^2)$ XOR operations. Decoding can be done within the allowed memory at the portal.

Recovery

Figure 6A:
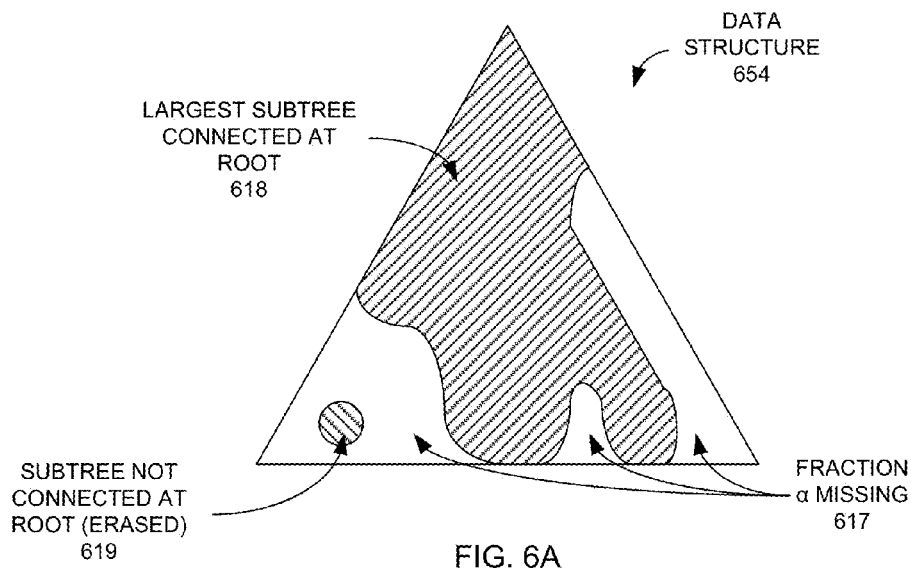
FIG. 6A is a diagram illustrating a partially recovered authenticated data structure.
Figure 6B:
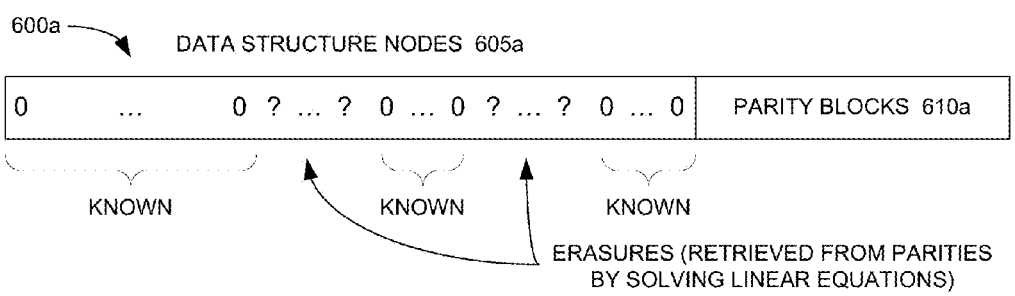
FIGS. 6B-6C are diagrams respective lists of known and unknown nodes and file blocks, respectively.
Figure 6C:
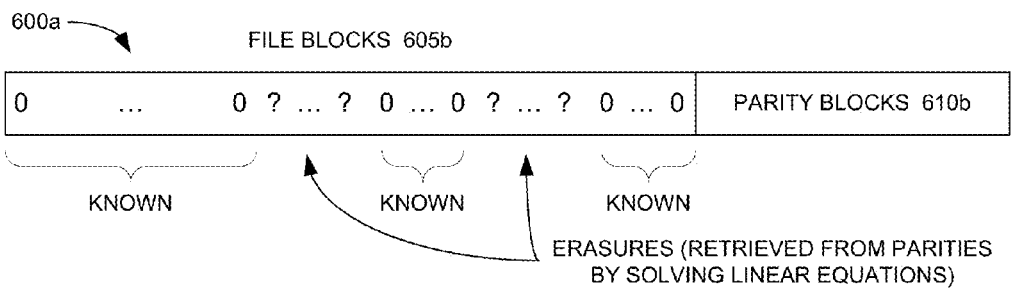
Figures 7A, 7B:
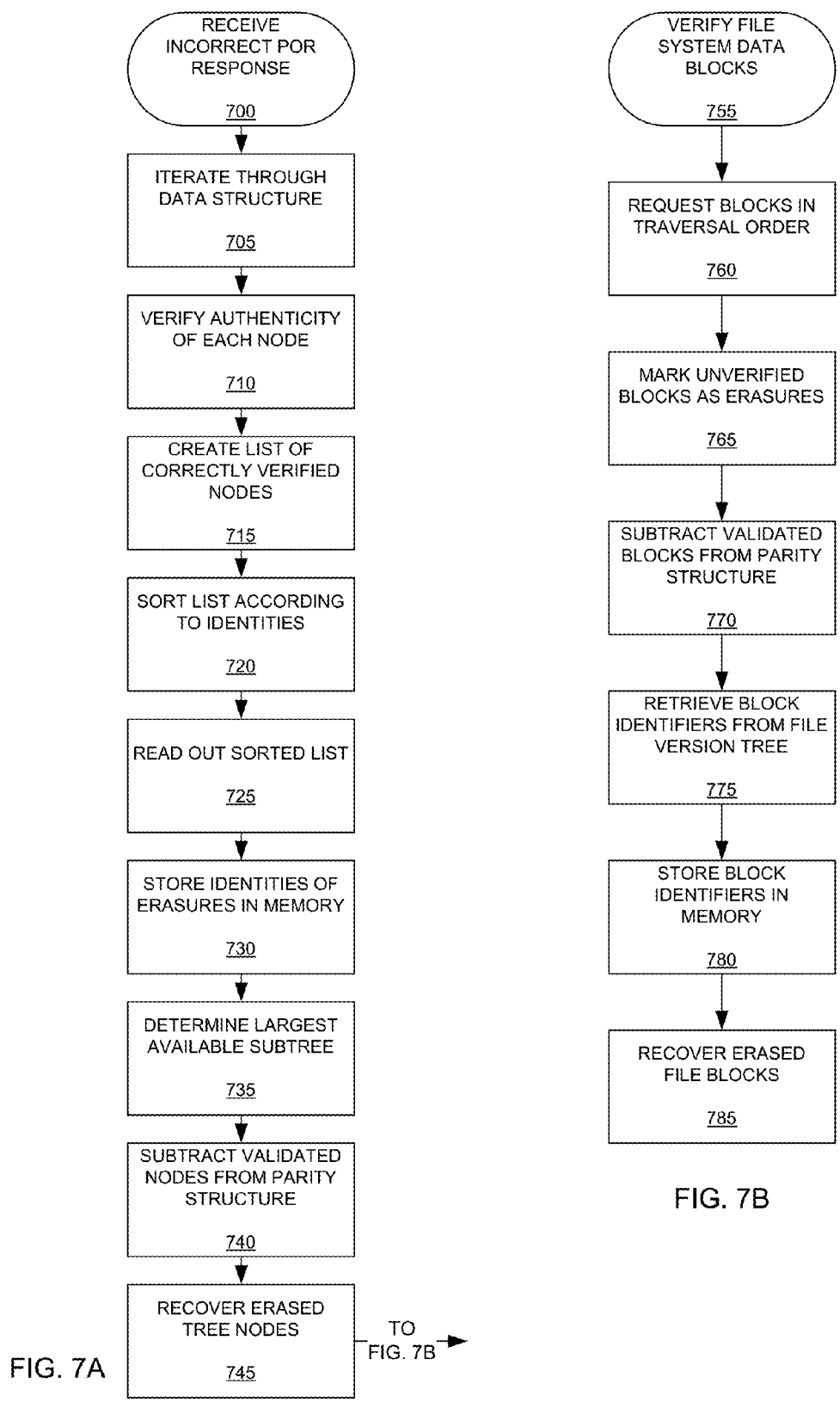
FIGS. 7A-7B are a flow diagram illustrating a method of recovering authenticated data structures and file systems according to an example embodiment of the present invention.

FIGS. 6A-6C and 7A-7B are respective block and flow diagrams illustrating recovery according to an example embodiment of the present invention. As illustrated in FIGS. 6A and 7A, if the portal 420 ever receives an incorrect PoR response (presumably a very rare event) (700), it can trigger recovery of the file system 448 in a streaming fashion. Assuming that the portal 420 does not have enough storage to download the full file system 448 and Merkle tree 454, it can download and recover parts of the file system 448 and stream the corrected version to a new provider.

The recovery proceeds in two steps. The portal 420 first needs to decode the Merkle tree and free list structure 454 containing the directory structure of the file system 448. The portal 420 iterates through the tree 454 in a standard traversal order (e.g., pre-order) (705), and verifies the authenticity of each tree node (710).

While iterating through the tree, the portal 420 creates an authenticated list of the identities corresponding to correctly verified nodes (715), which may be stored at the server (i.e., cloud 440) because it may not fit in the portal's 420 memory. The identities not covered by the list correspond to erasures. This list represents a connected subtree 618 rooted at the root of the complete data structure. Other subtrees not connected at the root 619 cannot be verified and are erased. In order to recover the erasures, the portal 420 sorts the list according to its identities (720). Since the portal 420 stores a counter indicating the range of all node identities that have been used, the portal 420 can retrieve, by reading out the sorted list (725), the identities of all erasures and store these in its memory (730).

The tree 610 is now reconstructed as best as possible, with a fraction a missing 617. The portal 420 may determine the largest available subtree 618 connected to the root of the Merkle tree (735). As illustrated in FIGS. 6B and 7A, validated nodes (of that largest available subtree) are subtracted from the parity structure 650 over the Merkle tree and free list 454 (740). Using the decoding algorithm of the erasure code, the erased tree nodes can be recovered from the parity blocks over the Merkle tree and free list 454 (745). The recovered tree nodes are streamed to, for example, a new provider.

Second, as illustrated in FIGS. 6C and 7B, after the complete tree structure has been recovered (i.e., FIGS. 6A, 6B and 7A), the portal 420 verifies the integrity and freshness of file system data blocks (755). The portal 420 requests blocks in a standard traversal order (760), and marks as erasures the blocks whose integrity is not verified (765). Each correct block is subtracted from the parity structure computed over file system data blocks (770). The block identifiers (i.e., file identifier together with block index) of missing or corrupted file blocks can be retrieved from the file-version tree corresponding to that block within the recovered Merkle tree and free list 454 (775). The portal 420 stores the block identifiers of missing or corrupted file blocks in its memory 428 (780). Using the decoding algorithm of the erasure code, the portal recovers all the corrupted file blocks from the parity blocks over the file system data blocks (785).

Further, parity blocks may be lost or corrupted erased as well. Thus, erased/corrupted parity symbols may be ignored, thereby producing a smaller matrix (i.e., columns that correspond to the erased parities are removed) for which a right inverse must be computed. Accordingly, decoding with erased parity symbols still works by solving a system of linear equations. For example, in a PoR, the trusted portal 420 stores all parity symbols, so, none of them should be erased. However, in other embodiments that may use erasure coding according to example embodiments of the present invention, such as network communications, both content packets and parity packets may be missing because there may be no trusted portal. Therefore, both content packets and parity packets may be treated equal and no second layer of erasure correction that encodes the parities is necessary. Therefore, such a sparse erasure coding may be used as a code in a layered (i.e., concatenated) coding scheme for network communications.

Dynamic PDP

Using the authenticated data structure, immediate construction of an efficient dynamic PDP protocol is possible. A PDP protocol does not need the parity structure over file system data blocks for recovering blocks; it only employs a challenge-response protocol to verify that a sufficient fraction of blocks is correct. As in the PoR challenge-response protocol, in a PDP the portal needs to challenge and check the integrity and freshness of c randomly selected blocks.

Detailed Analysis

This section first explains and analyzes erasure coding according to example embodiments of the present invention together with its encoding and decoding for a single stripe (i.e., m=1). Next, this section generalizes and analyzes multiple stripes, thereby proving a tight bound on the recovery failure probability $\rho$, and compares the bounds with the analysis of a single stripe. Finally, this section applies the bound to derive the theorem used in the analysis for practical example parameters (i.e., Theorem 1, described below).

Single Stripe (m=1)

Encoding

For the purpose of erasure coding, data blocks or tree nodes may be viewed as identifier-value pairs $\delta=(\delta_{id}; \delta_{val})$, where $\delta_{val}=(\delta_1, \ldots, \delta_b)$ is a sequence of b bits $\delta_1, \ldots, \delta_b$ and $\delta_{id}$ is a unique identifier. To randomize the mapping from data blocks to parity blocks, a keyed hash function $H_k(.)$ may be used that maps an identifier $\delta_{id}$ to a binary pseudo random vector $\theta=(\theta_1, \ldots, \theta_p)$ of p bits.

The parity structure may be represented by a b×p binary matrix P. Initially, no blocks are encoded into P and P equals the all-zero matrix. There are two primary operations: adding a block $\delta$ into P and subtracting a block $\delta$ from P. To add $\delta$, the client computes $H_k(\delta_{id})=\theta=(\theta_1, \ldots, \theta_p)$, constructs the b×p matrix $A=\delta_{val}(x) \theta=\{\delta_i\theta_j\}_{i,j}$ and updates the parity structure to $P \leftarrow P+A$. If the portal subtracts $\delta$, then A is subtracted from P, that is, $P \leftarrow P-A$, or equivalently $P \leftarrow P+A$, since addition is modulo 2.

Notice that P corresponds to blocks in B if $$p = \sum_{\delta \in B} \delta_{val} \otimes H_k(\delta_{id}). \quad (1)$$

Let $B_{val}$ be the matrix for which the columns correspond $\delta_{val}$, and let $B_{id}$ be the matrix for which the rows correspond to $H_k(\delta_{id})$. Then (1) can be rewritten as $$P=B_{val}B_{id}. \quad (2)$$

Notice that $B_{val}$ has b rows and $B_{id}$ has p columns. Since $H_k(.)$ is a keyed hash function, $B_{id}$ is a pseudo random binary matrix. Finally, notice that the parity structure P is a binary b×p matrix which requires s=b·p bits storage.

Decoding

Assume that the portal retrieves complete blocks from the server for which the correctness can be verified (blocks are part of an authenticated data structure which can be used to verify the integrity and freshness of blocks). Those blocks that verify correctly are subtracted from P. Let I be the set of all block identities of blocks that are corrupted (i.e., did not verify correctly) or missing (i.e., that were not send by the server). The blocks corresponding to I are called erasures. During recovery the portal knows all the identities of blocks that were added to the parity structure P, that is, the portal is able to reconstruct set I. Let B be the set of blocks that correspond to the unique identities in I. After subtraction of the correct blocks from P, matrix P corresponds to (1) where the $\delta_{id}$s are known to the client and the $\delta_{val}$s need to be reconstructed by the portal during decoding. This can be done by a Gaussian elimination. Since the portal stores the parity structure, the portal knows P. The portal knows I and therefore $B_{id}$. See (2). The portal needs to solve the linear system of equations $P=B_{val}B_{id}$ for $B_{val}$. This is only possible if $B_{id}$ has a right inverse (i.e., such that Gaussian elimination works properly).

If the number of blocks in B (i.e., the number of rows in $B_{id}$) is more than $\alpha$ (i.e., the number of columns of $B_{id}$), then $B_{id}$ does not have a right inverse. If the number of erasures (i.e., the number of blocks in B) is less than or equal to p, then $B_{id}$ may have a right inverse (over random binary matrices $B_{id}$ with equal probability of a 1 or 0 in each of its entries, the probability that all rows in $B_{id}$ are linearly independent is equal to $$\prod_{i=0}^{|B|-1}(1-2^{-(p-i)}) \geq 1 - \sum_{i=0}^{|B|-1} 2^{-(p-i)} \geq 1 - 2^{-(p-|B|)}. \quad (3)$$

Summarizing, the probability that erasure decoding fails is at most $2^{-(p-|B|)}$.

Analysis

In dynamic PoRs, the client queries/challenges random blocks, which the server needs to correctly respond to (the client verifies the responses by using the authenticated data structure). If all n file blocks are in a single stripe and if the client checks c random challenge response pairs, then, given j=|B| erasures, the probability (taken over a uniform distribution of challenge response pairs) that none of the challenge response pairs detects an erasure is equal to $$\binom{n-j}{c}/\binom{n}{c} = \binom{n-c}{j}/\binom{n}{j} \leq \frac{n-c}{n}\cdots\frac{n-c-j+1}{n-j+1} \leq (1-c/n)^j.$$

For c/n<½, given j erasures, the probability of decoding failure while all c challenge response pairs verify correctly is at most (see (3))

$$\min\{2^{-(p-j)},1\}(1-c/n)^j \leq (1-c/n)^p \leq e^{-pc/n}. \quad (4)$$

Hence, the probability ρ that not all blocks can be fully recovered, that is, the probability that erasure decoding fails while all c challenge response pairs verify correctly is at most $$\rho \leq e^{-pc/n}. \quad (5)$$

E.g., for $c=l\sqrt{n}$ and $p=h\sqrt{n}$, $\rho \leq e^{-lh}$, storage is $s=b\cdot p=O(\sqrt{n})$ bits and verification bandwidth equals $c=O(\sqrt{n})$ number of challenge response pairs.

If a file block is written, then its old version is subtracted from parity structure P and the new version is added to P. These operations are efficient if matrix $A=\delta_{val}\otimes Hk(\delta_{id})$ in (1) can be represented and computed in an efficient way. The length of vector $\delta_{val}$ is the size b of a block value; b is a fixed system parameter (e.g., b equals 4 KB or 32768 bits). Vector $H_k(\delta_{id})$ has size $p=h\sqrt{n}$. Vector $H_k(\delta_{id})$ has an efficient representation if it has $O(\log p)=O(\log n)$ ones in which case updating P only costs $O(b \log p)$ XOR operations together with one hash evaluation. That is, the fraction of ones in $H_k(\delta_{id})$ is $O((\log p)/p)$. As a result matrix $B_{id}$ is a random sparse binary matrix in which each entry is equal to 1 with probability $O((\log p)/p)$. Note that, if $p=O(\log n)$, then $H_k(\delta_{id})$ can be efficiently computed. However, for $p=O(\log n)$, ρ is small only if c scales linearly in n (see (4)), which is not practical.

For a random sparse binary matrix $B_{id}$, inequality (3) may not hold. If each entry is chosen independently and at random to be 1 with probability $q \leq (\ln p)/p$, then the rank properties of $B_{id}$ are not indistinguishable from the purely random case $q=½$. Conjectures that for $q>2(\ln p)/p$ and p large enough the rank properties of $B_{id}$ are indistinguishable from the purely random case, in particular a bound similar to (3) holds.

During decoding, the client needs to solve the linear system of equations $P=B_{val}B_{id}$ for $B_{val}$. If the server imposes j=|B|=p erasures, then probability ρ of recovery failure is maximized (see (4)). For p erasures, Gaussian elimination needs $p^2=h^2n$ storage (matrix $B_{id}$ has j=|B|=p rows and p columns). Notice that only $O(\sqrt{n})$ storage is allowed at the client's site. In order to improve on the amount of required storage for Gaussian elimination, the client needs to use $B_{id}$'s sparse structure.

Belief propagation works well (in O(p) time and within the allowed storage) for any sparse matrix $B_{id}$ that is sufficiently rectangular. An exponentially small upper bound is needed on ρ, so, an accurate estimate is needed on the probability that decoding fails.

Belief Propagation

If the number of rows in $B_{id}$ is $j \leq 1/q = O(p/\log p)$ with $q \approx 2(\ln p)/p$, then $B_{id}$ is expected to have a positive fraction of columns with a single 1. For such a sparse rectangular j×p matrix $B_{id}$, Gaussian elimination is efficient. Belief propagation may be used over the Binary Erasure Channel (BEC) for LDPC codes. The generator matrix of the LDPC code is the n×p matrix with rows $H_k(\delta_{id})$ for each of the n blocks δ (notice that it has $B_{id}$ as a submatrix). The construction of matrix $B_{id}$ is equivalent to the first iteration in the belief propagation algorithm. The decoding graph after the first iteration is a bipartite graph with nodes representing the rows of $B_{id}$ and nodes representing the columns of $B_{id}$; a row node and a column node are connected by an edge only if the corresponding entry in $B_{id}$ is 1. Since qjp equals the number of 1s in $B_{id}$, that is, the number of edges in the decoding graph after the first iteration, the remaining iterations cost qjp=O(p) blocks storage and run in qjp=O(p) time.

For $j \leq 1/q$, it is very likely that, before every iteration, the decoding graph is represented by a matrix having a positive fraction of columns with a single 1. This is a necessary condition for belief propagation to successfully complete erasure decoding. This corresponds to the independence assumption that each iteration is statistically independent of previous iterations in that the decoding graph at each iteration has the same edge degree distributions for row nodes and column nodes. Based on the independence assumption, a condition for successful erasure decoding using edge degree distributions can be derived. In particular, if $j \leq 1/p$, then the independence assumption implies successful erasure decoding. The independence assumption is correct for the r first iterations only if the neighborhood of a row node in the bipartite graph represented by $B_{id}$ up to depth r is a tree. After r iterations at most a small fraction of erasures (i.e., less than a constant) needs to be decoded using Gaussian elimination. It is likely that this can be done within the available amount of storage. However, if the set of linear equations after r iterations does not have full rank, then Gaussian elimination will fail.

Belief propagation works well for any sparse matrix $B_{id}$ that is sufficiently rectangular. Gaussian elimination fails with an exponentially small probability. For this reason, an analysis based on the independence assumption closely fits simulation results for LDPC codes in communication theory. However, an exponentially small upper bound is needed on $\rho$; therefore an accurate estimate on the probability that Gaussian elimination fails is needed. For example, suppose that f is such that for $j \leq p/(f \log p)$ (i.e., the larger f the more rectangular $B_{id}$) the probability of failing Gaussian elimination is $\leq 2^{-p/(f \log p)-j}$. Then, by using the arguments from which (4) and (5) are obtained, $$\rho \leq (1-c/n)^{p/(f \log p)} \leq e^{-pc/(nf \log p)}.$$

Multiple Stripes

Rather than using belief propagation, a specific sparse structure may be used in combination with (1) an efficient decoding algorithm that meets the storage requirements, together with (2) an efficient updating algorithm having $u=O(\log n)$, and for which (3) a tight upper bound may be provided on p without assuming any conjecture.

Accordingly, the single stripe may be split into m independent stripes each being a code word having $p=O(\log n)$ parities. Each block is assigned to exactly one stripe; hence, if the client updates a block, then on average only $u=p/2=O(\log n)$ parities of the corresponding stripe need to be updated (i.e., the multi-striped structure is indeed sparse).

Accordingly, a keyed hash function $H_k(.)$ maps an identity $\delta_{id}$ to a pseudo random bit string representing a pair $(\theta_{ind}; \theta)$, where $\theta=(\theta_1, \ldots, \theta_p)$ and $\theta_{ind}$ is the index of the stripe to which block $\delta=(\delta_{id}; \delta_{val})$ is added.

Each stripe i, $1 \leq i \leq m$, has its own parity structure P[i]. To add or subtract a block $\delta$, the client computes $H_k(\delta_{id})=(\theta_{ind}; \theta)$, constructs $A=\delta_{val}\bigotimes\theta$ as before, and updates $P[\theta_{ind}] \leftarrow P[\theta_{ind}]+A$.

Erasure decoding of the multi-striped structure consists of decoding each stripe separately. Successful decoding involves m times a Gaussian elimination, each time computing the right inverse of a $(\leq p) \times p$ matrix costing at most $p_2 = (\alpha/m)^2 = O((\log n)^2)$ XOR operations. Decoding can be done within the allowed storage.

Recovery Failure Probability

The recovery failure probability $\rho$ is equal to the probability that erasure decoding fails while all challenge response pairs verify correctly. As a technical preliminary, for integers p and u and $0 \leq \beta \leq 1$, let R(p, u, $\beta$) be the probability that a binary $\beta p \times p$ rectangular sparse matrix in which each entry is chosen independently and at random to be 1 with probability u/p does not have full rank. The following theorem expresses the upper bound on $\rho$ in terms of R(p, u, $\beta$).

In the purely random case $u=p/2$ and R(p, $u=p/2$, $\beta) \leq 2^{-(1-\beta)p}$, see (3). For $u>2 \ln p$ and $\beta$ sufficiently close to 1, R(p, u, $\beta) \approx R(p, p/2, \beta) \leq 2^{-(1-\beta)p}$.

Define $h(x)=-x \log_2 x - (1-x) \log_2(1-x)$ as the binary entropy function.

Protocol Analysis

Let n denote the maximum number of blocks in the file system. On the assumption of 4 KB-sized blocks, each file block stores $b=2^{15}$ bits and the file system's total possible storage equals nb bits. Here, "storage" denotes the total file system size.

The sparse erasure code has m stripes, each stripe has p parity blocks, so, the total amount of memory needed at the portal in order to store all parity blocks is equal to s=mpb.

Here, "memory" refers to the size of main memory at the portal 420 devoted to parity storage 430.

Suppose that the portal issues $c \leq n$ random challenge-response pairs. Note that, in a preferred embodiment, the challenges contain c/m blocks within each of the m stripes. Each response includes a Merkle-tree path as well as a block. Merkle-tree paths can vary in length, but are no more than 1 KB for reasonable file system parameterizations. For this reason, assume an upper bound of 5 KB communication per response (i.e., c·5 KB verification bandwidth).

It is then possible to compute the recovery probability $\rho$, defined as the probability that, given c random challenge-response pairs erasure decoding fails despite all challenge-response pairs verifying correctly. The following theorem provides a tight upper bound on $\rho$. This bound may be used to compute an upper bound on the verification bandwidth in the recovery probability $\rho$, the block size b, the file system's storage nb and memory at the portal mpb, as illustrated in Table 1.

TABLE 1

EXAMPLES FOR $\rho \leq 0.0074$, I.E., RECOVERY FAILURE PROB. $\leq 0.74\%$, I.E., $\leq 0.74\%$, BLOCK SIZE 4 KB AND 5 KB COMMUNICATION PER RESPONSE.

| Memory/Storage | p | $\epsilon = \frac{3}{4} c$ | p | $\epsilon = \frac{1}{3} c$ |
|---|---|---|---|---|
| 4 GB/1 TB | 178* | $2^{14.2} \to 93$ MB | 1667 | $2^{12.3} \to 24$ MB |
| 4 GB/10 TB | 169 | $2^{17.5} \to 0.9$ GB | 1781 | $2^{15.6} \to 0.23$ GB |
| 16 GB/100 TB | 186 | $2^{19.0} \to 2.5$ GB | 1965 | $2^{17.0} \to 0.63$ GB |
| 16 GB/1000 TB | 196 | $2^{22.3} \to 25$ GB | 2014 | $2^{20.2} \to 5.8$ GB |

In the sparse erasure code, when updating a file block, at most u out of the p parity blocks of the stripe to which the block belongs need to be updated. The sparse code is completely defined by the number of stripes m, the number of parities per stripe p and parameter u indicating the "sparsity" of the code.

As a technical preliminary, for integers p, u and $0 \leq \beta \leq 1$, let R(p, u, $\beta$) be the probability that a binary $\beta p \times p$ rectangular sparse matrix in which each entry is chosen independently and at random to be 1 with probability u/p does not have full rank. In the purely random case $u=p/2$ and R(p, $u=p/2$, $\beta) \leq 2^{-(1-\beta)p}$. For $u>2 \ln p$ and $\beta$ sufficiently close to 1, R(p, u, $\beta) \approx R(p, p/2, \beta) \leq 2^{-(1-\beta)p}$.

Theorem

Let $l \geq 1$. (i) Let $u=p/2$. Then, $\rho \leq 3 \cdot e^{-l}$ if $s/b \leq 2.0 \cdot \sqrt{np}$ and p and c satisfy $p \geq 4.6 \cdot (l+\ln(1.24 \cdot n)+\ln(s/(pb)))$, $c=5.1 \cdot (nb/s) \cdot (l+\ln(s/(bp)))$.

(ii) Let $u=p/2$. Then, $\rho \leq 2 \cdot e^{-l}$ if $n \gg c$ and p and c satisfy $p \geq 4.6 \cdot (l+\ln(0.37 \cdot n^{3/2}/c^{3/2})+\ln(s/(pb)))$, $c=5.1 \cdot (nb/s) \cdot (l+\ln(s/(bp)))$.

(iii) Let $u=p/2$ or let $u>2 \ln p$ such that R(p, u, $0.972) \leq 2^{-(1-0.972)p}$. Then, $\rho \leq 3 \cdot e^{-l}$ if $s/b \leq 2.0 \cdot \sqrt{np}$ and p and c satisfy $p \geq 51.45 \cdot (l+\ln(1.71 \cdot n)+\ln(s/(pb)))$, $c=1.54 \cdot (nb/s) \cdot (l+\ln(s/(bp)))$.

Example Parameters

For a selection of four example system parameters, Table 1 lists parities-per-stripe p and number of PoR challenges c (together with their corresponding verification bandwidth). This example is parameterized under a recovery failure upper bound of 0.74% (corresponding to technical parameter l=6 in Theorem 1). Values in the left column are based on Theorem 1(i) and values in the right column are based on Theorem 1(iii). For the entry labeled*, Theorem 1(i) yields p=159, which does not satisfy the condition $s/b \leq 2.0 \cdot \sqrt{np}$. In this case, the use of Theorem 1(ii) is necessary.

If $R(p, u, 0.972) \leq 2^{-(1-0.972)p}$ for $u > 2 \ln p = 2 \ln 2000 \approx 15.2$ is assumed, then for the right column the values also hold if each block affects an expected $u=16$ parity blocks out of the p parity blocks of the stripe to which it belongs. Thus it suffices that each file-block update induces only an expected $u=16$ operations (XORs) over the parity structure. Compared to the left column where $u=p/2$, this is a factor 5 improvement.

Remark

Notice that p and c are relatively independent of l (e.g., in the left column slightly increasing c with $5.1 \cdot nb/s$ (increasing the verification bandwidth by at most a couple percent) and by adding $\approx 5$ more parities to p, decreases $\rho$ by a factor e).

Theorem 2

For any value of technical parameters $0 \leq \beta$, $\epsilon \leq 1$ and $0 \leq \kappa \leq e^{1/4}/(2\pi)$, $$\rho \leq \frac{s}{pb} \cdot \left[ \frac{e^{1/8}}{\sqrt{\pi}} \sqrt{\frac{(2-\varepsilon)^3(1-\kappa)^2}{2\kappa(\kappa+\varepsilon-\varepsilon\kappa)}} n 2^{-(1-h((1-\varepsilon)/(2-\varepsilon))) \cdot \beta p} + \right.$$

$$\left. R(p, u, \beta) + e^{-(1-\varepsilon)\beta cs/(nb)} + e^{-(1-\kappa)cpb/s} \right].$$

For $\kappa \leq c/n$, the inequality holds with the term $e^{-(1-\kappa)cpb/s}$ removed.

Substituting $R(p, u, \beta) \leq 2^{-(1-\beta)p}$ and $\beta = 1/(2-h((1-\epsilon)/(2-\epsilon)))$, obtains the next theorem, which uses the monotonically increasing function $f \in [0, 1) \to [0, \infty)$ and monotonically decreasing function $g \in [0, 1] \to [0, 1]$, defined as $$f(\varepsilon) = (\ln 2)(1 - h((1-\varepsilon)/(2-\varepsilon)))/(1-\varepsilon),$$

$$g(\varepsilon) = (1-\varepsilon)/(2 - h((1-\varepsilon)/(2-\varepsilon))).$$

Theorem 3

Let $u = p/2$ or let $u > 2 \ln p$ and $\beta = 1/(2-h((1-\epsilon)/(2-\epsilon)))$ sufficiently close to 1 such that $R(p, u, \beta) \approx R(p, p/2, \epsilon) \leq 2^{-(1-\beta)p}$. Then, for any value of technical parameters $0 \leq \epsilon \leq 1$ and $0 \leq \kappa \leq e^{1/4/(2\pi)}$.

$$\rho \leq \frac{s}{pb} \cdot \left[ \left( 1 + \frac{e^{1/8}}{\sqrt{\pi}} \sqrt{\frac{(2-\varepsilon)^3(1-\kappa)^2}{2\kappa(\kappa+\varepsilon-\varepsilon\kappa)}} n \right) e^{-f(\varepsilon)g(\varepsilon)p} + \right.$$

$$\left. e^{-g(\varepsilon) \cdot cs/(nb)} + e^{-(1-\kappa)cpb/s} \right].$$

For $\kappa \leq c/n$, the inequality holds with the term $e^{-(1-\kappa)cpb/s}$ removed.

Proof of Theorems 2 and 3

Suppose that the client checks $c \leq n$ random challenge response pairs such that $c/m$ blocks within each of the m stripes are verified. Suppose that there are j erasures. The probability $\rho$ that not all blocks can be fully recovered given c challenge response pairs and j erasures must be computed. The recovery failure probability $\rho$ is equal to the probability that, given c challenge response pairs and j erasures, erasure decoding fails while all challenge response pairs verify correctly. The following will prove a tight upper bound on $\rho$.

Let $w_i$ be the number of blocks added to a stripe i. Note that $w_i$ is binomially distributed with length n and probability $1/m$; the expected number of blocks added to a single stripe is $w = n/m$ with standard deviation $\sqrt{(1-1/m)n/m} \leq \sqrt{w}$. Using Chernoff's bounds for the lower and upper tail of the binomial distribution obtains, for $t \geq 0$, $$Pr(w_i < w - t\sqrt{w}) < e^{-t^2/2}$$

and $$Pr(w_i > w + t\sqrt{w}) < \left( e^{t/\sqrt{w}}/(1+t/\sqrt{w})^{(1+t/\sqrt{w})} \right)^w \leq e^{-t^2/4} \text{ for } t/\sqrt{w} < 2e-1.$$

If $e^{-t^2/4} = \rho/r$, then $|w - w_i| \leq 2\sqrt{(\log r/\rho)/w}$ with probability $\geq 1 - \rho/r$. If $w \gg \log(r/\rho)$, then the approximation $w_i = w = n/m$ for each stripe holds with probability $\geq 1 - \rho/r$. This approximation may be used. Certain embodiments exclude the bounds on $w_i$ given by $|w - w_i| \leq 2\sqrt{(\log r/\rho)/w}$ for illustrative purposes.

Let $Pr(j_1, \ldots, j_m)$ with $j_1 + \ldots + j_m$ be the probability that the distribution of the j erasures over stripes is such that, for $1 \leq i \leq m$, stripe i has $j_i$ erasures. Since the keyed hash function outputs pseudo random sequences, the server cannot distinguish the actual assignment of blocks to stripes from a random assignment. Therefore, $$Pr(j_1, \ldots, j_m) = \left[ \prod_{i=1}^{m} \binom{w}{j_i} \right] / \binom{wm}{j_1 + \ldots + j_m}.$$

Define J as the set of sequences of non-negative integers that sum up to j (note that J has sequences of variable length).

Thus, given a distribution of $(j_1, \ldots, j_m) \in J$ erasures, the probability of decoding failure is equal to $$Pr(\text{failure} | j_1, \ldots, j_m) \leq \sum_{i=1}^{m} \min\{1, 2^{-(p-j_i)}\}. \quad (6)$$

If $j_i \leq w - c/m$ for all $1 \leq i \leq m$, then the probability of not detecting any erasure during the verification of all challenge response pairs is equal to $$Pr(\text{no-detection} | j_1, \ldots, j_m) = \prod_{i=1}^{m} \left[ \binom{w-j_i}{c/m} / \binom{w}{c/m} \right]. \quad (7)$$

If there exists an index i such that $j_i > w - c/m$, then $Pr(\text{no-detection} | j_1, \ldots, j_m) = 0$.

Since "failure" and "no-detection" are independent statistical events, $$\rho = \sum_{(j_1, \ldots, j_m) \in J} Pr(j_1, \ldots, j_m) \cdot \quad (8)$$

$$Pr(\text{failure} | j_1, \ldots, j_m) \cdot Pr(\text{no-detection} | j_1, \ldots, j_m).$$

The following lemmas derive tight upper bounds on each of the three probabilities in $\rho$.

Lemma 1

Let $0 \leq x \leq 1$ and let $$A \subseteq \left\{ (j_1, j_2) \, s.t. \binom{w}{j_1}\binom{w}{j_2} \Big/ \binom{2w}{j_1+j_2} \leq x \right\}.$$

Define $$z = \max_{(j_1, j_2) \in A} j_1 + j_2.$$

Then, $$\sum_{(j_1,\ldots,j_m) \in J \, s.t. (j_1, j_2) \in A} Pr(j_1, \ldots, j_m) \leq xz. \quad (9)$$

Proof

First substitute $$Pr(j_1, \ldots, j_m) = \frac{\binom{w}{j_1}\binom{w}{j_2}}{\binom{2w}{j_1+j_2}} \frac{\binom{2w}{j_1+j_2}\binom{w}{j_3}\cdots\binom{w}{j_m}}{\binom{2w+w+\ldots+w_m}{(j_1+j_2)+j_3+\ldots+j_m}}$$

into the left side of inequality (9). By using the stated assumption on set A, this yields the upper bound $$\sum_{(j_1,\ldots,j_m) \in J \, s.t.(j_1,j_2) \in A} x \frac{\binom{2w}{j_1+j_2}\binom{w}{j_3}\cdots\binom{w}{j_m}}{\binom{2w+w+\ldots+w_m}{(j_1+j_2)+j_3+\ldots+j_m}}.$$

Since $|\{(j_1, j_2) \in A \text{ s.t. } j_1+j_2 = j'\}| \leq z$ for any $j'$, the upper bound is $$\sum_{(j',j_3,\ldots,j_m) \in J} xz \frac{\binom{2w}{j'}\binom{w}{j_3}\cdots\binom{w}{j_m}}{\binom{2w+w+\ldots+w_m}{j'+j_3+\ldots+j_m}} = xz. \quad \text{QED.}$$

Lemma 2

For $j_1 \leq (1-\kappa)w$ with $0 \leq \kappa \leq e^{1/4}/(2\pi)$ and $j_2 \leq \gamma j_1$ with $0 \leq \gamma \leq 1$, $$\frac{\binom{w}{j_1}\binom{w}{j_2}}{\binom{2w}{j_1+j_2}} < \frac{e^{1/8}}{\sqrt{\pi}} \sqrt{\frac{1+\gamma}{2\kappa(1-\gamma(1-\kappa))}} 2^{-(1-h(\gamma/(1+\gamma))) \cdot j_1}.$$

Proof

The limiting case $j_2 = 0$ with $\gamma = 0$ follows from $$\binom{w}{j_1} \Big/ \binom{2w}{j_1} \leq (1 - w/(2w))^{j_1} = 2^{-j_1}.$$

For the general case, the following upper and lower bounds are used: for $v_0 > v_1 \geq 1$, $$\frac{e^{-1/8}}{\sqrt{2\pi}} C(v_0, v_1) < \binom{v_0}{v_1} < \frac{1}{\sqrt{2\pi}} C(v_0, v_1),$$

where $$C(v_0, v_1) = \frac{v_0^{v_0+1/2}}{v_1^{v_1+1/2}(v_0-v_1)^{v_0-v_1+1/2}}.$$

For $j_2 \neq 0$ (i.e., implying $j_1 \neq 0$), these bounds yield (after a reordering of terms) the upper bound $$\frac{\binom{w}{j_1}\binom{w}{j_2}}{\binom{2w}{j_1+j_2}} < \frac{e^{1/8}}{\sqrt{\pi}} \sqrt{\frac{j_1+j_2}{2j_1 j_2}} \sqrt{\frac{(w-j_1)+(w-j_2)}{2(w-j_1)(W-j_2)}} .$$

$$L\left[\frac{j_1-j_2}{j_1+j_2}\right]^{-(j_1+j_2)/2} \cdot L\left[\frac{(w-j_2)-(w-j_1)}{(w-j_2)+(w-j_1)}\right]^{-((w-j_2)+(w-j_1))/2}$$

where $$L[\gamma] = (1+\gamma)^{1+\gamma}(1-\gamma)^{1-\gamma} = 2^{2(1-h((1-\gamma)/2))}$$

for the binary entropy function $h(.)$.

The lemma follows after applying each of the following bounds: $L[\gamma] \geq 1$, applying $(j_1-j_2)/(j_1+j_2) \geq (1-\gamma)/(1+\gamma)$ obtains $L[(j_1-j_2)/(j_1+j_2)] \geq L[(1-\gamma)/(1+\gamma)]$, $(j_1+j_2)/2 \geq j_1/2$, applying $1 \leq j_2 \leq \gamma j_1$ obtains $\sqrt{(j_1+j_2)/(2 j_1 j_2)} \leq \sqrt{(1+\gamma)/2}$, and applying $0 \leq j_1 \leq (1-\kappa)w$ and $0 \leq j_2 \leq \gamma j_1 \leq \gamma(1-\kappa)w$ obtains $\sqrt{(2w-j_1-j_2)/(2(w-j_1)(w-j_2))} \leq 1/\sqrt{\kappa(1-\gamma(1-\kappa))w}$. QED.

From the two previous lemmas obtains:

Lemma 3

Let $0 \leq \beta, \gamma \leq 1$ and $0 \leq \kappa \leq e^{1/4}/(2\pi)$, and define $$B = \{(j_1, \ldots, j_m) \in J \text{ s.t. } \beta p \leq j_1 \leq (1-\kappa)w \text{ and } \exists j_i \leq \gamma j_1\}.$$

Then, $\Sigma_{(j_1,\ldots,j_m) \in B} Pr(j_1, \ldots, j_m)$ is at most equal to $$\frac{e^{1/8}}{\sqrt{\pi}} \sqrt{\frac{(1+\gamma)^3(1-\kappa)^2}{2\kappa(1-\gamma(1-\kappa))}} n 2^{-(1-h(\gamma/(1+\gamma))) \cdot \beta p}.$$

Proof

Let $x$ be the upper bound of Lemma 2 with $j_1$ lower bounded by $\beta p$. By symmetry arguments, the bound in Lemma 2 holds for $j_1 \leq (1-\kappa)w$ and any index $i$ such that $j_i \leq \gamma j_i$. So, set $B$ is a subset of $$\bigcup_{i=2}^{m} \{(j_1, \ldots, j_m) \in J \text{ s.t. } \beta p \leq j_1 \leq (1-\kappa)w,$$

-continued $$j_1 \leq \gamma j_1 \text{ and } \binom{w}{j_1}\binom{w}{j_i} \bigg/ \binom{2w}{j_1 + j_i} \leq x \bigg\}.$$

For each index pair (1, i) in this union, a set A is defined as in Lemma 1, where $z \leq (1+\gamma)(1-\kappa)w$. Application of Lemma 1 for each pair (1, i) proves that $\Sigma_{(j_1, \ldots, j_m) \in B} \Pr(j_1, \ldots, j_m) \leq (m-1)xz \leq (1+\gamma)(1-\kappa)nx$. QED.

Lemma 4

Let $0 \leq \beta, \gamma \leq 1$, and define $$B = \{(j_1, \ldots, j_m) \in J \text{ s.t. } \beta p \leq j_1 \text{ and } \forall_i j_i \leq \gamma j_1\}.$$

Then, for $(j_1, \ldots, j_m) \in B$, $$\Pr(\text{no-detection}|j_1, \ldots, j_m) \leq e^{-\gamma \beta cpm/n}.$$

Proof

If $(j_1, \ldots, j_m) \in B$, then all $j_i \geq \gamma \beta p$. Hence, probability $\Pr(\text{no-detection}|j_1, \ldots, j_m)$ is equal to (note that $c \leq mw = n$)

$$\prod_{i=1}^{m} \left[ \binom{w-j_i}{c/m} \bigg/ \binom{w}{c/m} \right] \leq [(1-(c/m)/w)^{\gamma \beta p}]^m \leq e^{-\gamma \beta cpm/n}. \text{QED}.$$

Lemma 5

Let $j_1 > (1-\kappa)w$ with $0 \leq \kappa \leq e^{1/4/(2\pi)}$. For $(j_1, \ldots, j_m) \in J$ and $\kappa > c/n$, $$\Pr(\text{no-detection}|j_1, \ldots, j_m) \leq e^{-(1-\kappa)c/m}.$$

If $\kappa \leq c/n$, then $\Pr(\text{no-detection}|j_1, \ldots, j_m) = 0$.

Proof

If $\kappa \leq c/n$, then $j_1 \geq (1-\kappa)w \geq (1-c/n)w = w - c/m$, hence, $\Pr(\text{no-detection}|j_1, \ldots, j_m) = 0$. For $\kappa > c/n$, $\Pr(\text{no-detection}|j_1, \ldots, j_m)$ is at most equal to, see (7), $$\binom{w-j_1}{c/m} \bigg/ \binom{w}{c/m} \leq (1-(c/m)/w)^{j_1} \leq e^{-j_1 c/n} \leq e^{-(1-\kappa)c/m}. \text{QED}.$$

Lemma 6

For any $0 \leq \beta, \gamma \leq 1$ and $0 \leq \kappa \leq e^{1/4/(2\pi)}$, $$p \leq m \cdot \left[ \frac{e^{1/8}}{\sqrt{\pi}} \sqrt{\frac{(1+\gamma)^3(1-\kappa)^2}{2\kappa(1-\gamma(1-\kappa))}} \; n2^{-(1-h(\gamma/(1+\gamma)))\beta p} + 2^{-(1-\beta)p} + e^{-\gamma \beta cpm/n} + e^{-(1-\kappa)c/m} \right].$$

For $\kappa \leq c/n$, the term $e^{-(1-\kappa)c/m}$ may be removed from the bound.

Proof

Note that if all $j_i \leq \beta p$, $1 \leq i \leq m$, then $\Pr(\text{failure}|j_1, \ldots, j_m)$ is at most equal to, see (6), $$\sum_{i=1}^{m} \min\{1, 2^{-(p-0 j_i)}\} \leq m 2^{-(1-\beta)p}. \quad (10)$$

Secondly, by symmetry Lemmas 3, 4 and 5 hold for $j_1$ replaced by any $j_i$. By combining all observations, $\rho$, see (8), is at most the right side of (10) plus m times the sum of the upper bounds stated in Lemmas 3, 4 and 5. This proves the lemma. QED Theorem 3 follows immediately from Lemma 6 by choosing $\beta$ such that $(1-h(\gamma/(1+\gamma)))\beta = 1-\beta$, that is, $$\beta = 1/(2-h(\gamma/(1+\gamma))),$$

and by substituting $m = s/(pb)$ and $\gamma = 1-\epsilon$, for $0 \leq \epsilon \leq 1$.

Rank properties only play a role in (6) and in (10). By replacing the bound in (10) by $m \cdot R(p, u, \beta)$ obtains Theorem 2.

Asymptotic

Let $\kappa = c/n$. Note that $(2-\epsilon)^3(1-\kappa)^2 \leq 8$ and $2\kappa(\kappa+\epsilon-\epsilon\kappa) \geq 2\kappa^2$. For $\epsilon \geq f^{-1}(cs/(npb))$, $f(\epsilon)g(\epsilon) > g(\epsilon)cs/(npb)$ and the terms in the upper bound of $\rho$ collapse leading to $$\rho \leq \frac{s}{pb}\left(2 + \frac{2 \cdot e^{1/8}}{\sqrt{\pi}} \frac{n^2}{c}\right) e^{-g(\epsilon) \cdot cs/(nb)}.$$

Note that if a single stripe is used, then $s = pb$ and $f^{-1}(cs/(npb)) = f^{-1}(c/n)$ which is close to 0 for $c = O(\sqrt{n})$. Note that $g(O) = 1$, so the bound in the theorem corresponds to (5).

A more precise analysis uses the Taylor expansion around ½ of the binary entropy function, $$h(x) = 1 - \frac{1}{2\ln 2} \sum_{i=1}^{\infty} \frac{(1-2x)^{2i}}{i(2i-1)},$$

hence, for $0 \leq \epsilon \leq 1$, $$h\left(\frac{1-\epsilon}{2-\epsilon}\right) = 1 - \frac{1}{2\ln 2} \sum_{i=1}^{\infty} \frac{(\epsilon/(2-\epsilon))^{2i}}{i(2i-1)} \leq 1 - \frac{\epsilon^2}{8\ln 2}$$

and $$h\left(\frac{1-\epsilon}{2-\epsilon}\right) = 1 - \frac{1}{2\ln 2} \sum_{i=1}^{\infty} \frac{(\epsilon/(2-\epsilon))^{2i}}{i(2i-1)}$$

$$\geq 1 - \frac{1}{2\ln 2} \sum_{i=1}^{\infty} (\epsilon/(2-\epsilon))^{2i}$$

$$= 1 - \frac{1}{2\ln 2} \left(\frac{1}{1 - \frac{\epsilon}{2-\epsilon}} - 1\right)$$

$$= 1 - \frac{\epsilon}{4\ln 2(1-\epsilon)}.$$

The upper bound proves $$f(\epsilon) \geq \epsilon^2/(8(1-\epsilon)) \geq \epsilon^2/8.$$

So, $\epsilon^2/8 \geq cs/(npb)$ implies $\epsilon \geq f^{-1}(cs/(npb))$. The lower bound proves $$g(\epsilon) \geq (1-\epsilon) \bigg/ \left(1 + \frac{\epsilon}{4\ln 2(1-\epsilon)}\right) \geq 1 - \frac{1+4\ln 2}{4\ln 2}\epsilon.$$

So, $$\rho \leq \frac{s}{pb}\left(2 + \frac{2 \cdot e^{1/8}}{\sqrt{n}} \frac{n^2}{c}\right) e^{-\left(1\frac{1+4ln2}{4ln2}\sqrt{8cs/(npb)}\right) \cdot cs/(nb)}.$$

For a single stripe, s=pb obtains $$\rho \leq \left(2 + 1.278 \cdot \frac{n^2}{c}\right) e^{-(1-3.849 \cdot \sqrt{c/n}) \cdot cp/n}$$

showing into what extent the bounding techniques weakened the bound in (5).

Remark

In a further refinement of the multi-striping structure, each block may be assigned to two arbitrary stripes each having half the number of parities (i.e., such that the cost of updating parities remains the same). Such a "two-dimensional" striping structure has the characteristics of a product code; successful erasure decoding is more likely. Note that a "multi-dimensional" striping structure tends to become the random sparse structure as discussed for the single stripe with the bound (5).

Example Parameters

Set $\kappa = e^{1/4/(2\pi)} = 0.204$ and $\epsilon = \frac{3}{4}$ (resulting in $f(\epsilon)=1.11$, $g(\epsilon)=0.196$, and $\beta=0.687 \ll 1$), the upper bound of Theorem 3 yields $$\rho \leq \frac{s}{pb} \cdot [(1 + 1.24 \cdot n)e^{-p/4.6} + e^{-cs/(5.1 \cdot nb)} + e^{-0.8 \cdot cpb/s}].$$

Note that the condition $s/b \leq 2.0 \cdot \sqrt{np}$ yields $cs/(5.1 \cdot nb) \leq 0.8 \cdot cpb/s$. Thus, letting $c=5.1 \cdot (nb/s) \cdot (l+ln(s/(bp)))$ for technical parameter l, obtains the following corollary:

Corollary 1

Let u=p/2. Then, for any l>1, if $s/b \leq 2.0 \cdot \sqrt{np}$, $c=5.1 \cdot (nb/s) \cdot (l+ln(s/(bp)))$ and $p \geq 4.6 \cdot (l+ln(1.24 \cdot n)+ln(s/(pb)))$, then $$\rho \leq 3 \cdot e^{-l}.$$

Setting $\kappa = e^{1/4/(2\pi)} = 0.204$ and $\epsilon = \frac{1}{3}$ (resulting in $f(\epsilon)=0.03$, $g(\epsilon)=0.648$, and $\beta=0.972$), obtains the following corollary:

Corollary 2

Let u=p/2 or let u>2 ln p such that $R(p, u, 0.972) \approx R(p, p/2, 0.972) \leq 2^{-(1-0.972)p}$. Then, for any l>1, if $s/b \leq 2.0 \cdot \sqrt{np}$, $c=1.54 \cdot (nb/s) \cdot (l+ln(s/(bp)))$ and $p \geq 51.45 \cdot (l+ln(1.71 \cdot n)+ln(s/(pb)))$, then $$\rho \leq 3 \cdot e^{-l}.$$

If condition $s/b \leq 2.0 \cdot \sqrt{np}$ in Corollary 1 is not satisfied, then $\kappa=c/n$ in Theorem 3. Together with $\epsilon=\frac{3}{4}$, this gives the slightly weaker bound $$\rho \leq \frac{s}{bp} \cdot \left[\left(1 + 0.37 \cdot \frac{n^{3/2}}{c^{3/2}}\right) e^{-p/4.6} + e^{-cs/(5.1 \cdot nb)}\right]$$

for n≫c.

Corollary 3:

Let u=p/2. Then, for any l>1, if n≫c, $c=5.1 \cdot (nb/s) \cdot (l+ln(s/(bp)))$ and $p \geq 4.6 \cdot (l+ln(0.37 \cdot n^{3/2}/c^{3/2})+ln(s/(pb)))$, then $$\rho \leq 2 \cdot e^{-l}.$$

The three corollaries combined prove Theorem 1.

Experimental Evaluation

Applicants ran several experiments to test the throughput of an authenticated file system under different types of workloads. The description below presents the setup and then the experiments.

Experimental Setup

The experimental setup comprises two computers: the portal and the cloud.

Portal Computer

The portal computer has an Intel Core i7 processor and 12 GB of RAM. The experiments were run on Windows 7 64-bit installed on a rotational disk, but no data was written to the portal's hard drive for the purpose of the experiments.

Cloud Computer

The cloud computer has 7 rotational hard drives with 1 TB of storage each. The file system and MAC files reside on these disks. The disks are used as separate devices and are not configured as a RAID array. This configuration mimics a cloud where each disk could potentially be on a separate physical machine.

The operating system (Windows 7 64-bit) runs on a separate additional hard drive to avoid interfering with the experiment. Additionally, the portal contains a 256 GB Crucial C300 SSD used for storing the Merkle tree.

Networking

Because the file system can handle very large throughput, three 1 Gbps cables were used to connect the two computers (i.e., the portal and the cloud). Each computer had 1 network port on the motherboard and 2 additional network cards. After accounting for networking overhead, the 3 Gbps combined connections between the two computers can handle about 300 MB/s of data transfer as experiments show.

Configurations

Even though seven hard drives were used for storage and three 1 Gbps network links were used between the portal and the cloud, under all workloads, the portal was never a bottleneck. Depending on the workload, the limiting factor was either the network or the hard drives.

Because of this observation, the experiments were run under two configurations:

End to End

The first configuration uses the entire setup. Write operations originate from clients (simulated as threads on the portal). Then they are processed by the portal and are multiplexed over the three network connections. Finally, data reaches the cloud computer and is written to the corresponding disk. Reads are similarly processed, but the data flow is in the opposite direction (from the cloud machine to the portal).

Portal Only

Because the limiting factor was never the portal's processing speed in the end-to-end experiments, another configuration of experiments was run in which no file data was sent between the portal and cloud. The goal of the Portal Only configuration was to determine the maximum throughput that the portal could achieve if additional networking hardware was available. The write operations to the cloud were dropped right before being sent over the network from the portal. Read operation responses from the cloud were simulated by creating random data on the cloud as it was needed. The Merkle tree nodes were still stored and fetched from the cloud.

Results

FIGS. 8A-9B are system performance graphs illustrating results of the above experiments. To evaluate the performance of the system, the speed of both sequential and random read/write file operations were measured. The random reads and writes were performed in 4 KB chunks. 10 GB files were used with the number of clients that simultaneously perform reads and writes being varied.

For the sequential experiments illustrated in FIGS. 8A-8B, when the number of clients is less than 3, the individual disks are the limiting factor. Each disk can support read and write operations at about 100 MB/s. Therefore when the number of clients reaches 3, the limiting factor becomes the 3 Gbps network connection between the cloud and the portal. Since the cloud computer only has 7 hard drives, the throughput degrades when there are more than 7 clients because multiple files are being written to the same hard drive causing seeks.

The random read/write operations illustrated in FIGS. 9A-9B are much slower than sequential ones. Random reads/writes cannot take full advantage of the version tree because consecutive blocks are unlikely to have the same version and therefore cannot be grouped into version ranges. Consequently compacting is not possible and the portal creates almost the full Merkle tree for the file. However, this is not a problem for the setup, because the rotational disks are even slower at handling random reads and writes.

The results illustrated in FIGS. 8A-9B show that the file system can handle workloads significant enough to max out at least a 3 Gbps link. Tenants typically connect to the cloud through the Internet. For Internet connections, speeds of 3 Gbps are significant even for modest enterprise tenants.

Figure 10:
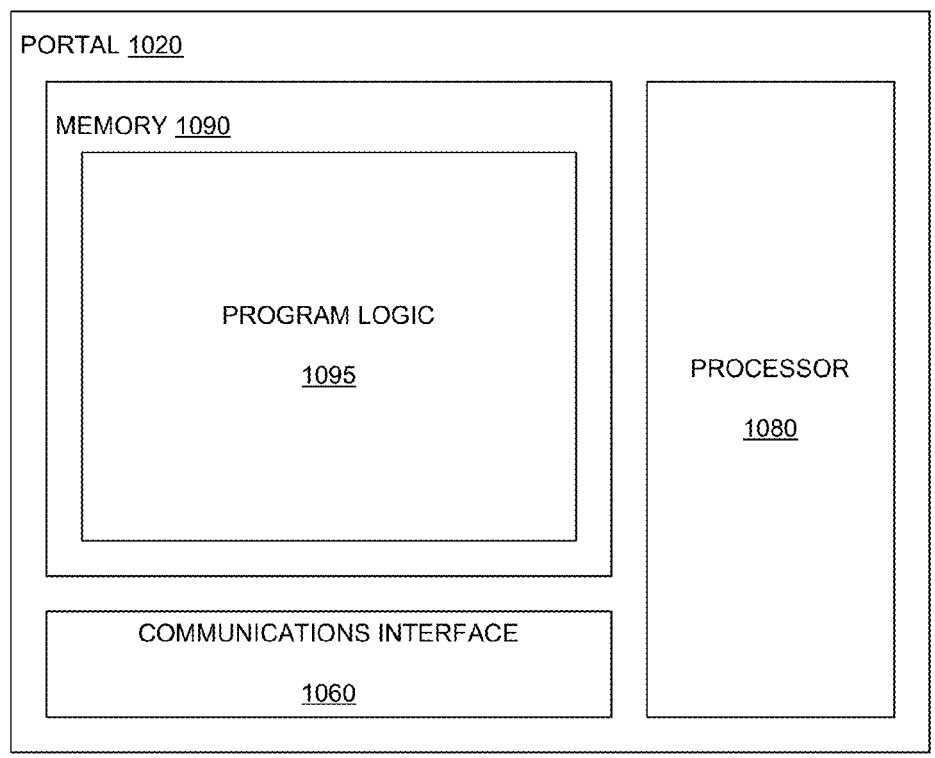
FIG. 10 is a block diagram of an example embodiment apparatus according to the present invention.

FIG. 10 is a block diagram of an example embodiment portal 1020 according to the present invention. The portal 1020 includes memory 1090 storing program logic 1095 for representing a file system according to an authenticated data structure, a communications interface 1060 and a processor 1080.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 11:
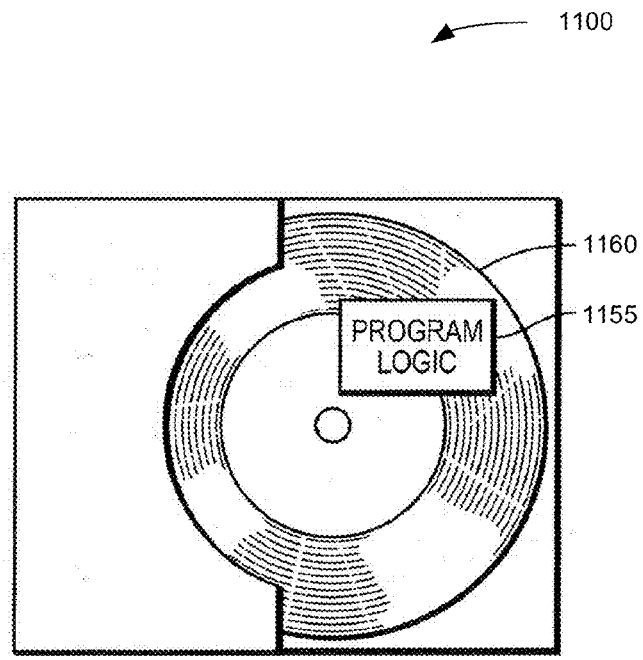
FIG. 11 is an illustration of an example embodiment of the present invention as embodied in program code.

FIG. 11 shows program logic 1155 embodied on a computer-readable medium 1160 as shown, and wherein the logic is encoded in computer-executable code configured for carrying out the methods for storing files in a distributed file system of this invention and thereby forming a computer program product 1100.

The logic for carrying out the method may be embodied as part of the aforementioned system, which is useful for carrying out a method described with reference to embodiments shown in, for example, FIGS. 1-7. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
   receiving a designation of a file system stored on untrusted storage;
   representing the file system according to an authenticated data structure, including a tree structure comprising a first subtree and a free list represented as a second subtree including a list of pointers to subtrees of removed blocks of the tree structure, by mirroring a directory structure of the file system onto the tree structure;
   erasure coding the file system;
   erasure coding the authenticated data structure representing the file system;
   storing a parity structure for the file system and a parity structure of the authenticated data structure at a trusted portal;
   verifying the storage of the file system by issuing a challenge to the storage to return a set of blocks of the file system and verifying a response from the storage;
      wherein a challenge comprises a list of random, uniformly selected blocks of the file system;
      wherein the response includes the requested file block and metadata for the requested file block;
      wherein verifying a response from the storage comprises verifying a path of each respective challenged file block to a root of the authenticated data structure represented by metadata of the response from the storage; and
      wherein issuing a challenge to the storage to return a set of blocks of the file system comprises at least one of issuing a batch of challenges to the storage and issuing a challenge seed to the storage, the storage configured to transform the seed to generate a plurality of challenges;
   tracking a number of nodes in the authenticated data structure to the left and right of the path during a traversal of the path; and
   determining whether an identifier of the file block of the range of identifiers corresponds to a file block included in the set of file blocks of the challenge.

2. The method of claim 1 wherein mirroring a directory structure of the file system onto the tree structure comprises:
   representing files of the file system as leaf nodes of the tree structure; and
   representing directories of the directory structure of the file system as non-leaf nodes of the tree structure.

3. The method of claim 2 wherein mirroring a directory structure of the file system onto the tree structure further comprises:
   providing intermediate non-leaf nodes of the tree structure to maintain a balanced tree structure.

4. The method of claim 2 wherein representing files of the file system as leaf nodes of the tree structure comprises representing versions of each respective file of the file system as a version tree for each respective file of the file system.

5. The method of claim 4 wherein representing versions of each respective file of the file system as a version tree for each respective file of the file system comprises:

representing blocks of respective versions of each respective file in the version tree; and maintaining metadata regarding the blocks in the version tree.

6. The method of claim 5 wherein representing blocks of respective versions of each respective file in the version tree comprises:
storing an identifier of respective ranges of blocks of each respective file at respective nodes in the version tree; and
storing a version number for each respective range of blocks of each respective file in the version tree.

7. The method of claim 1 further comprising:
to remove blocks from the tree structure,
replacing a pointer at a given node of the tree structure;
creating a new node in the free list; and
changing a pointer of the new node in the free list to point to the given node of the tree structure.

8. The method of claim 1 wherein a challenge comprises a list of random, uniformly selected blocks of the file system and wherein issuing a challenge to the storage to return a set of blocks of the file system comprises at least one of:
issuing a batch of challenges to the storage; and
issuing a challenge seed to the storage, the storage configured to transform the seed to generate a plurality of challenges.

9. The method of claim 1 wherein at least one of erasure coding the file system and erasure coding the authenticated data structure representing the file system comprises:
representing content for encoding as an identifier, value pair; and
providing for the identifier, according to a random function, a stripe identity indicating in which stripe the identifier may be found and a plurality of indicators indicating which parity symbols correspond to the identifier.

10. The method of claim 9 wherein at least one of the file system and the authenticated data structure experiences a failure, the method further comprising:
reading the authenticated data structured from untrusted storage storing the authenticated data structure; and
reconstructing a largest verified subtree of the authenticated data structure at a root of the authenticated data structure by verifying authenticity and freshness of nodes of the authenticated data structure by determining identifiers of nodes of the authenticated data structure that are missing or not verified and creating a sorted list of known node identifiers.

11. The method of claim 10 wherein at least one of the file system and the authenticated data structure is erasure coded at the untrusted storage, the method further comprising recovering failed portions of the authenticated data structure, comprising:
storing gaps in the sorted list of known node identifiers, the gaps representing unknown nodes; and
decoding the unknown nodes according to authenticated data structure parity structures stored at a trusted portal.

12. The method of claim 10 further comprising recovering failed portions of the file system, comprising:
traversing the authenticated data structure to a leaf of the authenticated data structure; and
for blocks missing or unverified as a result of the failure, decoding the missing or unverified blocks according to file system parity structures stored at a trusted portal.

13. The method of claim 12 wherein at least one of reconstructing a largest verified subtree of the authenticated data structure at a root of the authenticated data structure and decoding the missing or unverified blocks according to file system parity structures stored at a trusted portal comprises:
receiving a corrupted codeword;
subtracting known identifiers from the corrupted codeword such that only positions of unknown identifiers remain in the codeword;
updating the parity structure of the codeword according to the subtraction of the known identifiers; and
recovering values corresponding to the unknown identifiers according to the updated parity structure.

14. The method of claim 13 wherein recovering the unknown identifiers according to the updated parity structure comprises performing a transformation on the plurality of indicators for each respective unknown identifier.

15. The method of claim 1 further comprising:
to add blocks to the tree structure,
replacing a pointer at a given node in the free list, the given node previously including a pointer pointing to a given node of the tree structure;
changing a pointer of a desired node of the tree structure to point to the given node of the tree structure; and
repurposing the subtree of removed blocks of the tree structure represented by the given node of the tree structure.

16. An apparatus comprising:
a processor; and
memory encoded with instructions that, when executed on the processor, cause the processor to perform the operations of:
receiving a designation of a file system stored on untrusted storage;
representing the file system according to an authenticated data structure, including a tree structure comprising a first subtree and a free list represented as a second subtree including a list of pointers to subtrees of removed blocks of the tree structure, by mirroring a directory structure of the file system onto the tree structure;
erasure coding the file system;
erasure coding the authenticated data structure representing the file system;
storing a parity structure for the file system and a parity structure for the authenticated data structure at a trusted portal;
verifying the storage of the file system by issuing a challenge to the storage to return a set of blocks of the file system and verifying a response from the storage;
wherein a challenge comprises a list of random, uniformly selected blocks of the file system;
wherein the response includes the requested file block metadata for the requested file block;
wherein verifying a response from the storage comprises verifying a path of each respective challenged file block to a root of the authenticated data structure represented by metadata of the response from the storage; and
wherein issuing a challenge to the storage to return a set of blocks of the file system comprises at least one of issuing a batch of challenges to the storage and issuing a challenge seed to the storage, the storage configured to transform the seed to generate a plurality of challenges;
tracking a number of nodes in the authenticated data structure to the left and right of the path during a traversal of the path; and
determining whether an identifier of the file block of the range of identifiers corresponds to a file block included in the set of file blocks of the challenge.

17. The apparatus of claim 16 wherein mirroring a directory structure of the file system onto the tree structure comprises:
representing files of the file system as leaf nodes of the tree structure; and
representing directories of the directory structure of the file system as non-leaf nodes of the tree structure.

18. The apparatus of claim 17 wherein mirroring a directory structure of the file system onto the tree structure further comprises:
providing intermediate non-leaf nodes of the tree structure to maintain a balanced tree structure.

19. The apparatus of claim 17 wherein representing files of the file system as leaf nodes of the tree structure comprises representing versions of each respective file of the file system as a version tree for each respective file of the file system.

20. The apparatus of claim 19 wherein representing versions of each respective file of the file system as a version tree for each respective file of the file system comprises:
representing blocks of respective versions of each respective file in the version tree; and
maintaining metadata regarding the blocks in the version tree.

21. The apparatus of claim 20 wherein representing blocks of respective versions of each respective file in the version tree comprises:
storing an identifier of respective ranges of blocks of each respective file at respective nodes in the version tree; and
storing a version number for each respective range of blocks of each respective file in the version tree.

22. The apparatus of claim 16 further comprising:
to remove blocks from the tree structure,
replacing a pointer at a given node of the tree structure;
creating a new node in the free list; and
changing a pointer of the new node in the free list to point to the given node of the tree structure.

23. The apparatus of claim 16 wherein a challenge comprises a list of random, uniformly selected blocks of the file system and wherein issuing a challenge to the storage to return a set of blocks of the file system comprises at least one of:
issuing a batch of challenges to the storage; and
issuing a challenge seed to the storage, the storage configured to transform the seed to generate a plurality of challenges.

24. The apparatus of claim 16 wherein at least one of erasure coding the file system and erasure coding the authenticated data structure representing the file system comprises:
representing content for encoding as an identifier, value pair; and
providing for the identifier, according to a random function, a stripe identity indicating in which stripe the identifier may be found and a plurality of indicators indicating which parity symbols correspond to the identifier.

25. The apparatus of claim 16 wherein at least one of the file system and the authenticated data structure experiences a failure and wherein the memory is further encoded with instructions that, when executed on the processor, cause the processor to perform the operations of:
reading the authenticated data structure from untrusted storage storing the authenticated data structure; and
reconstructing a largest verified subtree of the authenticated data structure at a root of the authenticated data structure.

26. The apparatus of claim 24 wherein at least one of the file system and the authenticated data structure experiences a failure and wherein the memory is further encoded with instructions that, when executed on the processor, cause the processor to perform the operation of:
reading the authenticated data structure from untrusted storage storing the authenticated data structure; and
reconstructing a largest verified subtree of the authenticated data structure at a root of the authenticated data structure by verifying authenticity and freshness of nodes of the authenticated data structure by determining identifiers of nodes of the authenticated data structure that are missing or not verified; and
creating a sorted list of known node identifiers.

27. The apparatus of claim 26 wherein at least one of the file system and the authenticated data structure is erasure coded at the untrusted storage, the instructions further comprising recovering failed portions of the authenticated data structure, comprising:
storing gaps in the sorted list of known node identifiers, the gaps representing unknown nodes; and
decoding the unknown nodes according to authenticated data structure parity structures stored at a trusted portal.

28. The apparatus of claim 26 wherein the memory is further encoded with instructions that, when executed on the processor, cause the processor to perform the operations of recovering failed portions of the file system, comprising:
traversing the authenticated data structure to a leaf of the authenticated data structure; and
for blocks missing or unverified as a result of the failure, decoding the missing or unverified blocks according to file system parity structures stored at a trusted portal.

29. The apparatus of claim 28 wherein at least one of reconstructing a largest verified subtree of the authenticated data structure at a root of the authenticated data structure and decoding the missing or unverified blocks according to file system parity structures stored at a trusted portal comprises:
receiving a corrupted codeword;
subtracting known identifiers from the corrupted codeword such that only positions of unknown identifiers remain in the codeword;
updating the parity structure of the codeword according to the subtraction of the known identifiers; and
recovering values corresponding to the unknown identifiers according to the updated parity structure.

30. The apparatus of claim 29 wherein recovering the unknown identifiers according to the updated parity structure comprises performing a transformation on the plurality of indicators for each respective unknown identifier.

31. The apparatus of claim 16 further comprising:
to add blocks to the tree structure,
replacing a pointer at a given node in the free list, the given node previously including a pointer pointing to a given node of the tree structure;
changing a pointer of a desired node of the tree structure to point to the given node of the tree structure; and
repurposing the subtree of removed blocks of the tree structure represented by the given node of the tree structure.

32. A method for decoding an erasure coding, the method comprising:
receiving a corrupted codeword, the codeword comprising a plurality of identifiers and a parity structure;
subtracting known identifiers from the corrupted codeword such that only positions of unknown identifiers remain in the codeword;
updating the parity structure of the codeword according to the subtraction of the known identifiers; and
recovering values corresponding to the unknown identifiers according to the updated parity structure.

33. The method of claim 32 wherein recovering values corresponding to the unknown identifiers according to the updated parity structure comprises performing a transformation to the plurality of indicators for each respective unknown identifier.

34. The method of claim 33 wherein the corrupted codeword includes a corrupted parity structure.

35. An apparatus for decoding an erasure coding, the apparatus comprising:
  a processor; and
  memory encoded with instructions that, when executed on the processor, cause the processor to perform the operations of:
    receiving a corrupted codeword, the codeword comprising a plurality of identifiers and a parity structure;
    subtracting known identifiers from the corrupted codeword such that only positions of unknown identifiers remain in the codeword;
    updating the parity structure of the codeword according to the subtraction of the known identifiers; and
    recovering values corresponding to the unknown identifiers according to the updated parity structure.

36. The apparatus of claim 35 wherein recovering values corresponding to the unknown identifiers according to the updated parity structure comprises performing a transformation to the plurality of indicators for each respective unknown identifier.

37. The apparatus of claim 36 wherein the corrupted codeword includes a corrupted parity structure.

38. A computer-program product including a non-transitory computer-readable storage medium encoded with computer-program code that, when executed on a processor of a computer, cause the computer to represent a file system according to an authenticated data structure, the computer-program code comprising:
  computer-program code for receiving a designation of a file system stored on untrusted storage; and
  computer-program code for representing the file system according to an authenticated data structure, including a tree structure comprising a first subtree and a free list represented as a second subtree including a list of pointers to subtrees of removed blocks of the tree structure, by mirroring a directory structure of the file system onto the tree structure;
  computer program code for erasure coding the file system;
  computer program code for erasure coding the authenticated data structure representing the file system;
  computer program code for storing a parity structure for the file system and a parity structure for the authenticated data structure at a trusted portal;
  computer program code for verifying the storage of the first system by issuing a challenge to the storage to return a set of blocks of the file system and verifying a response from the storage;
    wherein a challenge comprises a list of random, uniformly selected blocks of the file system;
    wherein the response includes the requested file block and metadata for the requested file block;
    wherein verifying a response from the storage comprises verifying a path of each respective challenged file block to a root of the authenticated data structure represented by metadata of the response from the storage; and
    wherein issuing a challenge to the storage to return a set of blocks of the file system comprises at least one of issuing a batch of challenges to the storage and issuing a challenge seed to the storage, the storage configured to transform the seed to generate a plurality of challenges;
  computer program code for tracking a number of nodes in the authenticated data structure to the left and right of the path during a traversal of the path; and
  computer program code for determining whether an identifier of the file block of the range of identifiers corresponds to a file block included in the set of file blocks of the challenge.

39. The computer-program product of claim 38 further comprising:
  computer-program code for representing content for encoding as an identifier, value pair; and
  computer-program code for providing for the identifier, according to a random function, a stripe identity indicating in which stripe the identifier may be found and a plurality of indicators indicating which parity symbols correspond to the identifier.

40. A computer-program product including a non-transitory computer-readable storage medium encoded with computer-program code that, when executed on a processor of a computer, cause the computer to decode an erasure coding, the computer-program code comprising:
  computer-program code for receiving a corrupted codeword, the codeword comprising a plurality of identifiers and a parity structure;
  computer-program code for subtracting known identifiers from the corrupted codeword such that only positions of unknown identifiers remain in the codeword;
  computer-program code for updating the parity structure of the codeword according to the subtraction of the known identifiers; and
  computer-program code for recovering values corresponding to the unknown identifiers according to the updated parity structure.

* * * * *